United States Patent
Lee et al.

(10) Patent No.: US 6,529,520 B1
(45) Date of Patent: Mar. 4, 2003

(54) METHOD AND DEVICE FOR BANDWIDTH ALLOCATION IN MULTIPLE ACCESS PROTOCOLS WITH CONTENTION-BASED RESERVATION

(75) Inventors: Whay Chiou Lee, Cambridge, MA (US); Firass Abi-Nassif, Medford, MA (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/655,618

(22) Filed: Sep. 1, 2000

Related U.S. Application Data

(60) Provisional application No. 60/151,885, filed on Sep. 1, 1999.

(51) Int. Cl.$^7$ .............................................. H04B 7/212
(52) U.S. Cl. ...................... 370/442; 270/458; 270/468
(58) Field of Search .................................. 370/442, 443, 370/445, 447, 448, 458, 461, 462, 468, 477

(56) References Cited

U.S. PATENT DOCUMENTS

| | | | | |
|---|---|---|---|---|
| 4,593,282 A | * | 6/1986 | Acampora et al. | 340/825.5 |
| 5,537,396 A | * | 7/1996 | Alles et al. | 370/236 |
| 5,570,355 A | * | 10/1996 | Dail et al. | 370/352 |
| 5,590,131 A | * | 12/1996 | Kabatepe | 370/461 |
| 5,953,344 A | * | 9/1999 | Dail et al. | 370/443 |
| 5,956,338 A | * | 9/1999 | Ghaibeh | 370/395 |
| 6,014,545 A | * | 1/2000 | Wu et al. | 725/228 |

OTHER PUBLICATIONS

Rivest, "Network Control by Bayesian Broadcast," technical report MIT/LCS/TM-287, MIT Lab. for Computer Science, 1985.

Thomopoulos, "A Simple and Versatile Decentralized Control for Slotted Aloha, Reservation Aloha, and Local Area Networks," IEEE Trans. on Communications, vol. 36, No. 6, Jun. 1988.

Wojciech Szpankowski, "Analysis and Stability Considerations in a Reservation Multiaccess System," IEEE Trans. Communications, vol. COM-31, No. 5, May 1983).

N. Golmie, et al., "A Review of Contention Resulution Algorithms for IEEE 802.14 Networks," IEEE Communication Surveys, 1999.

Dolors Sala et al., "Adaptive Control Mechanism for Cable Modem MAC Protocols," Proceedings of IEEE INFOCOM '98, Mar. 29–Apr. 2, 1998.

S. Tasaka et al., "A Reservation Protocol for Satellite Packet Communication—A Performance Analysis and Stability Considerations," IEEE Trans. Communications, vol. COM-32, No. 8, Aug. 1984.

F. Abi-Nassif, et al., "Offered Load Estimation in a Multimedia Cable Network System," IEEE ICC '99, Vancouver, Jun. 6–10, 1999.

\* cited by examiner

*Primary Examiner*—Douglas Olms
*Assistant Examiner*—Bob A. Phunkulh
(74) *Attorney, Agent, or Firm*—Paul F. Bawel

(57) ABSTRACT

The problem of allocating bandwidth on the upstream channel of an HFC cable network for contention-based transmission of requests that are used to reserve upstream bandwidth for transmission of user data is solved by a method of allocation which dynamically adapts to the prevailing offered load of reservation requests. In one embodiment this is done by determining an appropriate size for a contention interval in each upstream transmission frame by attempting to balance the rates of flow of user data into and out of a virtual global data queue using a fluid approximation method that is based on a solution to a balanced equation relating the demand and supply of slots for data transmission within each frame.

15 Claims, 16 Drawing Sheets

METHOD AND DEVICE FOR BANDWIDTH ALLOCATION IN MULTIPLE ACCESS PROTOCOLS WITH CONTENTION-BASED RESERVATION

This application claims the benefit of provisional application No. 60/151,885, Sep. 1, 1999.

FIELD OF THE INVENTION

The invention relates generally to communication systems, and more particularly to scheduling for bandwidth allocation in a shared medium communication network that employs a contention-based reservation mechanism for coordinating channel access.

BACKGROUND OF THE INVENTION

Communication networks and technologies have been evolving rapidly to meet current and future demands for efficient remote information exchange and high-speed Internet access. In some communication networks, referred to as shared medium networks, transmission resources are shared among a population of users. In a shared medium network, users independently access the network via stations, and uncoordinated transmissions from different stations may interfere with one another. Such a network typically includes a number of secondary stations that transmit on the shared channel, and a single primary station situated at a common receiving end of the shared channel for, among other things, coordinating access by the secondary stations to the shared channel.

Protocols that are employed to coordinate access to a shared channel are often referred to as Medium Access Control (MAC) protocols. MAC protocols fall into two basic categories: contention-based and contention-free protocols. In contention-based protocols, end users contend with one another to access channel resources. Collisions are not avoided by design, but are either controlled by requiring retransmissions to be randomly delayed, or resolved using a variety of other contention resolution strategies. In contention-free protocols, end users access a shared channel in a controlled manner such that transmissions are scheduled either statically, or adaptively so that collisions are completely avoided.

An example of a contention-based MAC protocol is known as an Aloha protocol. Its original version, which operates with continuous or unslotted time is referred to as Unslotted Aloha. The behavior and performance of Unslotted Aloha have been studied widely, and its maximum throughput is well known to be 1/(2e). A later version of the Aloha protocol, which operates with discrete or slotted time, is referred to as Slotted Aloha. Many variations and extensions have been derived from the original Slotted Aloha protocol. In this protocol, and most of its derivatives, provided the probability of a new transmission and that of a retransmission in each slot are small, the throughput in a slot can be approximated by $G(n) \exp\{-G(n)\}$, where $G(n)$ is the offered load or attempt rate i.e., the number of packet arrivals per packet transmission opportunity, which is a function of n that denotes the number of backlogged users at the beginning of a given time slot. It follows that the maximum throughput of Slotted Aloha is $1/e=0.368$, which is attained when $G(n)=1$, i.e. one packet arrival per packet transmission opportunity. The constant e is the base for natural logarithm. It is to be noted that the value 1/e reflects the efficiency of Slotted Aloha, as it indicates on the average one successful packet transmission every e packet transmission opportunities.

Most contention-based protocols, including the Aloha protocols, resolve collisions by using feedback information on the number of users involved in the collisions. Based on this feedback information, each backlogged user executes a predetermined back off strategy to ensure stable operation of the protocol. In practice, feedback information used is typically ternary indicating zero, one, or more transmissions, or binary indicating exactly one transmission or otherwise.

It is well known that ordinary Slotted Aloha is unstable. Various methods for stabilizing Slotted Aloha exist, and many of them resort to adaptive control of the back off scheme based on one or more states of the contention process. When the actual values of these states are not observable, they are estimated by a variety of means. The stability of Slotted Aloha can be controlled by means of a dynamic frame structure, based on an a posteriori expected value of the backlog at the beginning of each frame. Rivest proposed a Pseudo-Bayesian algorithm to maintain the attempt rate $G(n)$ close to 1 by estimating the number, n, of backlogged users at the beginning of each slot (Rivest, "Network Control by Bayesian Broadcast," technical report MIT/LCS/TM-287, MIT Lab. for Computer Science, 1985). A minimum mean-squared error predictor for estimating the channel backlog in Slotted Aloha was proposed by Thomopoulos for regulating the retransmission probability according to a recursive function of the channel backlog estimate (Thomopoulos, "A Simple and Versatile Decentralized Control for Slotted Aloha, Reservation Aloha, and Local Area Networks," IEEE Trans. on Communications, Vol. 36, No. 6, June 1988).

In a contention-free multiple access protocol with static scheduling, such as that of a Time Division Multiple Access (TDMA) scheme, a predetermined transmission pattern is repeated periodically. The users may access channel resources only during the time intervals assigned to them individually. Contention-free protocols with static scheduling for resource allocation are inefficient for supporting a large population of users where, typically, only a fraction of the users are active at any time. In a contention-free multiple access protocol with adaptive scheduling, the transmission pattern may be modified in each cycle, via reservation, to accommodate dynamic traffic demand. A reservation scheme typically requires a centralized controller to manage reservations. A fraction of the channel, or a separate channel, is often used to support the overhead due to reservation.

It has been known that reservation protocols with contention-based transmission of request messages are particularly suitable for a shared medium communication system in which there is a large population of bursty users with long messages. This is the case in a Hybrid Fiber Coaxial Cable Network with a Cable TV headend coupled through an optical fiber mode to a two way coaxial amplifier to which are attached a number of cable modems.

In the prior art, the channel is modeled as a stream of transmission slots of a fixed size. The channel is divided into frames, wherein the number of transmission slots in each frame is fixed. Each frame consists of a contention interval, and a data interval. Each contention interval contains a number of contention slots that are allocated for contention-based transmission of reservation packets in accordance with the Slotted Aloha protocol. Each reservation packet carries appropriate control information including the number of data slots requested. Each data interval contains a number of data slots that are allocated for transmission of reserved data packets. Depending on the granularity of the transmission slots, a contention slot may be an integral fraction of a transmission slot or an integral multiple of a transmission slot. Typically, the granularity of the transmission slots is selected such that a data slot is either a single transmission slot or an integral multiple of a transmission slot. In any case, a contention slot is typically much smaller than a data slot.

Szpankowski teaches a frame-based contention-based reservation system, wherein Slotted Aloha is used to coordinate transmission of reservation requests and each successful request transmission in a frame reserves a data slot in a data interval of a future frame. In accordance with the teaching of Szpankowski, provided the sizes of each frame and the two intervals in it are respectively fixed, system throughput in the steady state is maximized when the ratio of the number of data slots in each frame to the number of contention slots in the same frame is equal to 1/e, which is the throughput of Slotted Aloha (Wojciech Szpankowski, "Analysis and Stability Considerations in a Reservation Multiaccess System," IEEE Trans. Communications, Vol. COM-31, No. 5, May 1983). In other words, the number of contention slots allocated in a frame must be such that the ratio of the number of data slots allocated in the frame to the number of contention slots in the frame is 1/e, i.e., the efficiency of Slotted Aloha.

Dail, et al., teach a method for a headend to dynamically adjust the number of mini-slots (corresponding to contention slots) over a period of time as a function of the type, or mix, of communications traffic. This dynamic allocation therefore does not adapt to changing request offered load. The dynamic allocation does however depend upon the traffic mix, which includes contention-type traffic (e.g., bursty traffic) that requires contention-based reservation and reservation-type traffic (e.g., isochronous traffic) that is allocated transmission opportunities without the need for contention-based reservation (J. Dail, C. Li, P. Magill, and K. Sriram, "Method and Apparatus Enabling Enhanced Throughput Efficiency by Use of Dynamically Adjustable Mini-Slots in Access Protocols for Shared Transmission Media," U.S. Pat. No. 5,953,344, Sep. 14, 1999). Specifically, the method considers a frame-based system with data slots of a fixed size, wherein the data slots in each frame are divided among contention-type traffic and reservation-type traffic, such that reservation-type traffic takes priority over contention-type traffic. In accordance with the method of Dail, et al., given the number of data slots needed for the transmission of reservation-type data packets in each frame, the remaining number of data slots in the frame are to be allocated for transmission of contention-type data packets as well as the contention-based request packets that are used for reserving data slots for contention-type traffic. Since request packets are typically considerably smaller than data packets, the data slots used for transmission of request packets are converted to mini-slots for contention usage. The teaching of Dail, et al., is based on the assumption that each mini-slot resolves contention requests at the same efficiency as a Slotted ALOHA system, i.e., each mini-slot has a throughput efficiency of 1/e. For practical reasons, Dail, et al., further assume that this efficiency is scaled down by about 90%, so that it is about 1/3. Specifically, Dail, et al., teach that the number of contention mini-slots allocated in a frame must be such that the ratio of the average number of contention-type messages that are allocated data slots in the frame to the number of mini-slots in the contention interval of the frame is 1/3. The method of Dail, et al., allows the number of data slots that may be reserved for each contention-type message to be a random number with a predetermined average value. It is to be noted that the method of Dail, et al., is in essence a straightforward extension of Szpankowski's method as described before.

Golmie, et al., have considered a slight variation of the method of Dail, et al. (N. Golmie, et al., "A Review of Contention Resolution Algorithms for IEEE 802.14 Networks," IEEE Communication Surveys, 1999). Likewise, while the method of Golmie, et al., does not dynamically depend upon request offered load, but on traffic mix, in their approach, the ratio of the average number of contention-type messages that are allocated data slots in a frame to the number of mini-slots in the contention interval of the frame is 1/2, instead of 1/3, and no contention slot is allocated when the number of data slots pending allocation exceeds 2.5 times the remaining number of data slots in the frame. Similarly to the method of Dail, et al., the method of Golmie, et al., focuses on the changing data offered load of the reservation-type traffic, but not on the changing request offered load of the contention-type traffic.

In a frame-based system, each frame in a contention-based reservation system is often constrained by a minimum frame size. In some cases, this constraint is due to a maximum round trip delay in the system, wherein a minimum frame size that is greater than the maximum round trip delay enables all users who transmitted request messages in a frame to receive feedback in time for retransmission in the contention interval of the next frame if necessary. In other cases, the constraint is due to limits on processing capacity in the headend, which dictates a maximum frame scheduling frequency.

There may be leftover slots when there is not enough data to utilize the available slots in a frame of a minimum size. There may also be leftover slots if packets are not permitted to be fragmented in order to pack a frame completely. When there are leftover slots that cannot be used for data transmission, they may be utilized for other purposes. For example, leftover slots in a frame may be included in the contention interval of the frame for contention-based transmission of request messages.

It is to be noted that if the headend is able to process scheduling on a slot by slot basis, then bandwidth allocation in a slotted shared medium network does not have to be frame-based. However for Hybrid Fiber Coaxial Cable Networks, information is transmitted on a frame-by-frame basis in accordance with the DOCSIS protocol. Sala, et al., teach a slot-based system based on a frameless MAC protocol, wherein contention opportunities are inserted continuously as they are needed, based on a predetermined contention slot allocator that allocates contention slots to accommodate an estimated demand for contention access (Dolors Sala, John O. Limb, and Sunil U. Khaunte, "Adaptive Control Mechanism for Cable Modem MAC Protocols," Proceedings of IEEE INFOCOM '98, Mar. 29–Apr. 2, 1998). The method follows a strategy that allocates for contention-based reservation all slots that are not being used for data transmission. The number of contention opportunities allocated per data slot is derived by maximizing steady state contention throughput.

In accordance with the teaching of Sala, et al., when there is negligible round trip delay in the network, contention opportunities will continuously be allocated until there is a successful request transmission, and each successful request transmission will be followed by the transmission of a data packet. Non-zero round trip delay lowers the effectiveness of the method for additional contention opportunities will be allocated from the time a request is successfully transmitted until the time the corresponding reserved data slots are allocated. At low data load, since there is plenty of unused bandwidth that could be used for contention reservation, many more contention opportunities than the number required for stable operations are allocated. The surplus of contention opportunities reduces the probability of collision to a very low level, which in turn reduces contention access delay. As data load increases, the method converges to allocating an average of e (about 2.7183) contention opportunities per data slot.

The above prior art gives priority to reserved data slots over contention opportunities. No contention opportunities are allocated unless all reserved data slots have been allocated. This policy can result in high contention access delay when the data offered load is high. Sala, et al., offers a method for improving the performance of the contention slot allocator, wherein a dynamically determined number of contention opportunities are forced between data slots, in addition to the unreserved contention opportunities. This number of forced contention opportunities is based on an approximation of the number of contention opportunities required to maximize contention throughput in accordance with the Slotted Aloha model, wherein the product of the average number of packets per data message and the number of forced contention opportunities is equal to e. It is to be noted that the teaching of Sala, et al., follows the same spirit of the teaching of Szpankowski, in the sense that the number of forced contention opportunities in an extended period of time must be such that the number of data messages that may be transmitted within that period is equal to the expected number of successful request transmissions in the forced contention opportunities within the same period, wherein the expected number of successful request transmissions in the forced contention opportunities in a given period is given by the product of the number of contention opportunities within the period and 1/e, i.e., the efficiency of Slotted Aloha.

A mechanism, known as piggybacking, is sometimes used to decrease the contention offered load when the system is operating with high data load. With piggybacking, a request that would otherwise require contention access could be inserted in a data packet to reserve additional data transmission slots. In this respect, upstream bandwidth utilization is more efficient due to reduced contention overhead. When there is piggybacking, the number of forced contention opportunities is thus scaled down by a factor that accounts for the piggyback load.

With respect to all of the above fixed frame systems, not one takes into account differing or changing request offered loads. Without taking into account the request offered load on a dynamic basis one cannot allocate bandwidth dynamically to optimize with respect to certain performance objectives, including contention access delay, data scheduling delay, and a trade-off between them. Contention access delay is the time from the generation of a request to reserve mini-slots for transmission of the data packet to the time the request is successfully transmitted and accepted by the headend. Data scheduling delay is the delay from the time the request is accepted by the headend to the time the data packet is completely transmitted on the channel.

Tasaka and Ishibashi have studied the performance and stability conditions of a contention-based reservation protocol (S. Tasaka and Y. Ishibashi, "A Reservation Protocol for Satellite Packet Communication—A Performance Analysis and Stability Considerations," IEEE Trans. Communications, Vol. COM-32, No. 8, August 1984). They have devised a procedure for determining an optimum set of system parameters for stable operation of the system, given an offered load, such that the average message delay is minimized, wherein the set of system parameters include the numbers of transmission slots in the contention interval and the data interval. Given the offered load, the procedure determines, for each combination of the numbers of transmission slots in the contention interval and the data interval, a probability of retransmission in each frame such that the average message delay is minimized. This step is repeated for a sufficiently large number of combinations of the numbers of transmission slots in the contention interval and the data interval, until a global minimum of the average message delay can be determined. It is to be noted that this method is computationally involved, and it is not clear how one would know when the global minimum of the average message delay is actually attained.

With respect to one shared medium network, a multiple access protocol with contention-based reservation may be applied to bandwidth allocation in an upstream channel of a Hybrid Fiber-Coaxial (HFC) cable network. The primary station in the cable network, which is often referred to as a headend, is basically a centralized controller that allocates upstream bandwidth to a group of secondary stations, which are often referred to as cable modems. This is accomplished by transmitting downstream a control message containing an information element known as a MAP. Each MAP specifies the allocation of transmission opportunities in a transmission frame that consists of a group of contiguous slots in the upstream channel. Each frame is divided into a contention interval for contention-based reservation and a data interval for data transmission. Secondary stations with data to send transmit requests in the Contention interval to reserve for transmission opportunities in data intervals of future frames. The outcomes of contention depend on the request offered load in terms of the number of requests generated per slot. Each transmission opportunity within a contention interval may end up with no request transmitted in it (Idle), one request transmitted in it (Success), or multiple requests transmitted in it (Collision). The headend provides a positive acknowledgment in a future MAP to each user with a successful request transmission. A successful transmission of a request from a secondary station reserves a data transmission opportunity in a future frame for the secondary station. A secondary station whose request transmission is not acknowledged in a future MAP after a predetermined amount of time is required to backoff for some time before retransmitting the request. A typical procedure used for collision resolution is truncated binary exponential backoff, wherein a backoff window limits the range of random backoff, and an initial backoff window is doubled in successive attempts for retransmission. As the binary exponential backoff approach is known to lead to instability in heavy load, a maximum number of retransmissions for a request is imposed to terminate the otherwise indefinite backoff.

As will be appreciated, a need remains for a simple method and a device for allocating bandwidth dynamically to adapt to changing request offered load in a contention-based reservation protocol used in a slotted shared medium communication network, wherein transmission slots are allocated on a frame by frame basis. As noted above, a frame-based system is specified by the DOCSIS protocol, and it is desirable to efficiently allocate bandwidth in the :upstream channel of the HFC cable network, while minimizing overall message delay, which consists of contention access delay and data scheduling delay.

SUMMARY OF THE INVENTION

In the subject system, which is a frame-based contention-based reservation system, the dividing line between slots allocated for contention and data in each frame is ascertained by taking into account request offered load as well as data offered load. Request offered load means the number of requests generated per slot. Data offered load is reflected in the number of slots reserved by each successfully transmitted request.

In accordance with the present invention, the population of users collectively and randomly generate requests with an offered load that is quasi-static, i.e., the request offered load may change slowly with time. In the operation of a frame-based contention-based reservation system, when a request is generated in a given frame, it must wait until the next frame before it is eligible for transmission. It is to be noted that the request offered load in a given frame translates to an effective request offered load in the contention interval of the following frame. The request offered load may be known a priori, or estimated as proposed in a prior art by Abi-Nassif, et al. (F. Abi-Nassif, W. C. Lee, and I. Stavrakakis, "Offered Load Estimation in a Multimedia Cable Network System," IEEE ICC '99, Vancouver, Jun. 6–10, 1999).

Note that unlike prior frame-based systems in which request offered load is taken to be static, the dynamic nature of the request offered load in the subject system determines the number of slots allocated for the contention and data intervals. This system thus allocates the number of slots for contention and data in each frame to optimize with respect to certain performance objectives, including contention access delay, data scheduling delay, and a trade-off between them.

It will be appreciated that although the subject system considers each frame to possibly have a different size, it is obviously applicable when frame size is fixed. In one embodiment of the invention, the system takes into consideration the changing request offered load in allocating the number of slots for contention and data in each frame to maximize contention throughput. It will be appreciated that such allocation minimizes the chance for the contention-based reservation system to become unstable, i.e. the number of slots allocated for contention is not sufficient to serve all backlogged requests timely, thereby enabling the system to operate with bounded contention access delay.

In another embodiment, the system allocates the number of slots for contention and data in each frame to maximize contention throughput when the system is overloaded, i.e., excessive request offered load, and otherwise guarantees a fixed minimum number of slots for contention. It will be appreciated that such allocation not only minimizes the chance for the contention-based reservation system to become unstable, but also lowers contention access delay at minimal expense of data scheduling delay when the system is non-overloaded.

In yet another embodiment, the system allocates the number of slots for contention and data in each frame to maximize contention throughput when the system is overloaded, and otherwise balances supply and demand of slots for data transmission, wherein the demand is a function of request offered load and data offered load. It will be appreciated that such allocation not only minimizes the chance for the contention-based reservation system to become unstable, but also minimizes contention access delay while ensuring that data scheduling delay is bounded when the system is non-overloaded.

All the above embodiments take into account the changing request offered load. The subject system initially makes a tentative allocation in the contention interval, such that the allocation is bounded from below by the allocation that maximizes contention throughput. Should there be any leftover slots in the frame after allocating the remaining slots for data transmission, the leftover slots are included in the contention interval of the frame. There may be leftover slots because there may not be enough reserved slots pending allocation to fill up the remainder of the frame, or there may not be a perfect fit of data slots in the remainder of the frame.

The second and third embodiments further take into account the average number of slots reserved per successfully transmitted request as well as the desired utilization of a data scheduler, which is used to allocate slots in data intervals among user data flows. It will be appreciated that the number of slots reserved per successfully transmitted request reflects the data offered load in the system, and the desired utilization of the data scheduler dictates an upper-bound on data scheduling delay for a given data scheduler. It will be appreciated that the present invention does not depend on any specific data scheduler design, but on the desired utilization of the data scheduler. In general, data scheduling delay increases with the utilization of the data scheduler, and typically increases without bound as utilization approaches 1. In practice, one would set the utilization of the data scheduler to a value close to one, but leave enough room such that data scheduling delay can be bounded as desired.

The subject system makes use of a supply and demand model in which the demand depends upon the request offered load. In this system, an appropriate size for a contention interval in each upstream transmission frame is determined by attempting to balance the rates of flow of user data.into and out of a virtual global data queue, wherein a fluid approximation method is used that is based on a solution to a balanced equation relating the demand and supply of slots. In normal non-overload operation, the system initially makes a tentative allocation in the contention interval, such that the allocation is bounded from above by the solution to the balanced equation. Whenever the system is undergoing transient overload, the subject system allocates slots in the contention interval to maximize contention throughput. In any case, should there be any leftover slots in the frame after allocating the remaining slots for data transmission, the leftover slots are included in the contention interval of the frame.

In summary, the problem of allocating bandwidth on the upstream channel of an HFC cable network for contention-based transmission of requests that are used to reserve upstream bandwidth for transmission of user data is solved by a method of allocation which dynamically adapts to the prevailing offered load of reservation requests. In a preferred embodiment, this is done by determining an appropriate size for a contention interval in each upstream transmission frame by attempting to balance the rates of flow of user data into and out of a virtual global data queue using a fluid approximation method that is based on a solution to a balanced equation relating the demand and supply of slots for data transmission within each frame.

BRIEF DESCRIPTION OF THE DRAWINGS

The above-mentioned and other features of the invention will now become more apparent by reference to the following description taken in connection with the accompanying Drawings in which.

DETAILED DESCRIPTION

Figure 1:
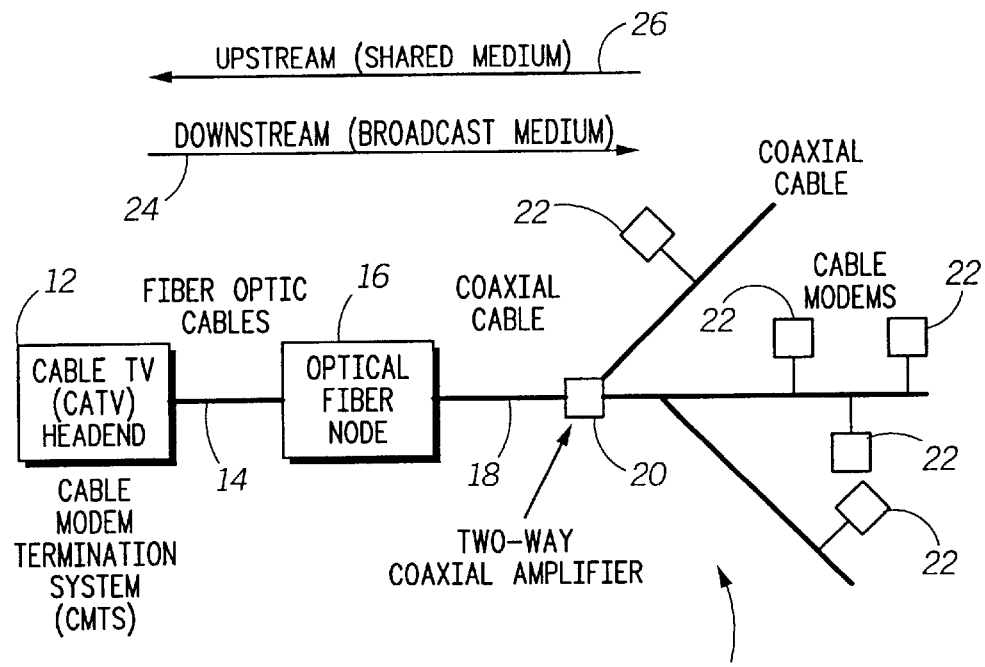
FIG. 1 is a diagrammatic representation showing a Hybrid Fiber-Coaxial Cable Network illustrating a Cable TV headend system coupled to a number of cable modems seeking to transmit data to the headend system.

While the subject system may be utilized in any system involving multiple access protocols with contention-based reservations, one of its major applications is in HFC Cable Networks. By way of example and referring to FIG. 1, an HFC Cable Network has a cable TV headend system 12 coupled via fiber optic cables 14 through an optical fiber node 16 and coaxial cable 18 to a two-way coaxial amplifier 20 to which are attached a number of cable modems 22. It is noted that the downstream direction is indicated by arrow 24 which is the broadcast medium, whereas the upstream direction indicated by 26 is the shared medium. Note that the cable TV headend system 12 has a cable modem termination system or CMTS, which will be referred to hereinafter.

It will be appreciated that it is the purpose of the subject system to be able to minimize the delay in the communication on the upstream channel of cable modems vying for transmission opportunities to transmit their data to the cable TV headend system. The problem is to allocate the bandwidth in the upstream direction to permit each of the cable modems to communicate with the headend.

Figure 2:
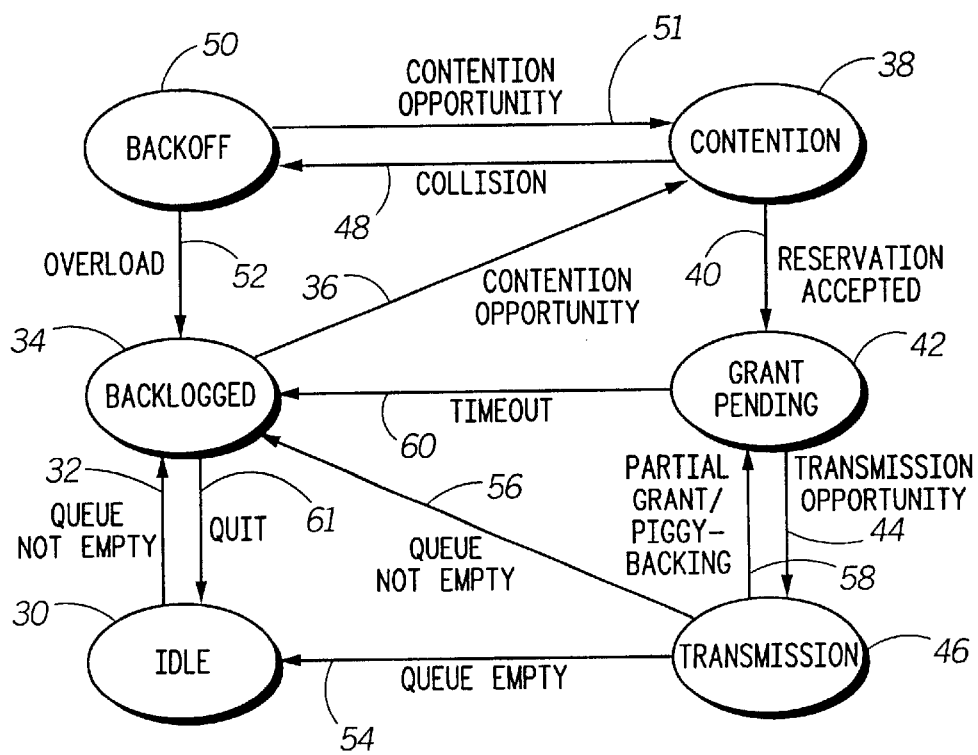
FIG. 2 is a diagrammatic representation showing a contention based reservation system in which requests for bandwidth reservation are sent in contention mode, and bandwidth is granted based on resolving contention conflicts.

FIG. 2 shows a state diagram describing the possible states of a user or cable modem and the conditions for transition among the states in a generic contention-based reservation system. It will be seen that there is an Idle state 20 of a particular modem, which means that the modem does not have data to be transmitted. When data is to be transmitted, a data queue at the modem is filled and is therefore not empty 32. An idle modem becomes backlogged when there is a new arrival to its empty data queue. To reflect this, the modem moves to a Backlogged state 34, in which it waits for a contention opportunity to transmit a request to reserve upstream bandwidth for data transmission. When a contention opportunity is available 36, the modem moves to a Contention state 38 and transmits the request in a contention mode.

If the transmitted request encounters a collision 48 due to simultaneously request transmissions from other active modems, the modem moves to a Backoff state 50, in which a predetermined contention resolution procedure is executed. After an appropriate backoff time, the modem may retransmit its request upon arrival of a contention opportunity 51. If the system is overloaded 52, the modem may end up abandoning its current request, moves back to the Backlogged state 34, and transmit a new request when the next contention opportunity is available 34. If the modem has a successful transmission of its request when it is in the Contention state 38, i.e., the reservation is considered accepted 40 by the headend, the modem moves to a Grant Pending state 42, and waits for a transmission opportunity for its backlogged data. In this state, if the anticipated grant is not received after a timeout period 60, the modem may subsequently reenter contention via the Backlogged state 34.

In the Grant Pending state 42, when a data transmission opportunity is received 44, the modem moves to a Transmission state 46. In the Transmission state 46, if the bandwidth allocated is sufficient such that the modem's queue becomes empty 54, the modem returns to the Idle state 30. If there have new arrivals to the modem's queue since it last left the Idle state 30, i.e., its queue remains non-empty 56, the modem may subsequently reenter contention via the Backlogged state 34. If the latest transmission opportunity is a partial grant 58, or a new request is pending due to piggybacking 58, the modem returns to the Grant Pending state 42 to wait to the next grant, since the modem's request for bandwidth does not have to go through contention again.

In the Backlogged state, if the modem has waited too long for an attempt to reserve upstream bandwidth for data transmission via contention-based reservation, the modem may decide to quit and discard the outstanding request, as illustrated at 61, because the data in its queue has become obsolete.

More particularly, in a Hybrid Fiber Coaxial, HFC, a cable network has a Cable TV headend coupled through an optical fiber node to a two way coaxial amplifier to which are attached a number of cable modems through a number of branches. The problem to be solved is to allocate the bandwidth in the upstream direction, so as to permit each of the cable modems to communicate with the headend with the least overall delay. The way this is accomplished is through a contention-based reservation system utilizing a scheme for allocating slots in the contention interval and data interval of each frame, wherein the scheme is a function of request offered load.

In the subject system from the point of view of the cable modem, when the cable modem has data to be transmitted, a queue at the cable modem will be filled and therefore is non-empty. The fact of a non-empty queue indicates a backlog and is recorded as a backlogged state in which the user or cable modem wait; for a contention opportunity. Contention opportunity is an opportunity to send a request in a contention mode.

It will be appreciated that with a number of cable modems seeking to communicate with the headend system there can be a collision of requests, in which a collision must be resolved before a reservation can be accepted. If there is a collision, then the fact of a collision results in the backing off for an amount of time in accordance with a predetermined contention resolution algorithm until a request can be resent. The request can be resent when it is indicated that there is a contention opportunity.

It will be noted that in one embodiment, the backoff is a random process in which the backoff period backs off by a random amount. It will be appreciated that the contention resolution is based on the aforementioned truncated binary exponential backoff algorithm. Nonetheless, other contention resolution algorithms may also be used.

Because according to the exponential algorithm when the request is made, it is for a slot in the contention interval. The request then contends with other requests and at some time the request can be accepted. The reservation grant depends on such time as the headend system allocates a transmission opportunity at which time this is communicated back to the cable modem and the transmission of the data takes place.

If there is no more data to be transmitted, this will result in a queue empty condition at the cable modem.

There will also be an occasion after the cable modem has left its idle state and has indicated that the queue is not empty, additional data arrives at the cable modem. This additional data will require additional bandwidth not previously requested. Therefore, the process has to accommodate the additional bandwidth which is necessary.

Thirdly, it is possible that a headend system may partially grant bandwidth. This fact is known at the time of transmission and a request for more bandwidth need not go through a contention cycle.

The DOCSIS protocol also permits piggybacking of a request for additional bandwidth, which request need not go through the contention cycle.

For the partial grant or the piggybacking scenario, one just simply goes to the Grant-Pending state and waits for the next transmission opportunity.

As mentioned above, the headend forecast bandwidth is an allocation map, in which a map indicates who gets to transmit when. This is done by allocating transmission opportunities in upstream frames. Each frame contains a contention interval and a data interval.

The problem is how to allocate upstream bandwidth dynamically. Given request offered load, average message size, piggyback load and other factors the system has to determine the allocation bandwidth for the request and the data transmission. The subject invention dynamically determines bandwidth allocation to optimize with respect to certain performance objectives, including contention access delay, data scheduling delay, and a trade-off between them. The contention access delay and the data scheduling delay are two components of an overall channel access delay, which can be minimized by selecting an appropriate trade-off between the two component delays.

As will be described, under normal operations, the present invention minimizes contention access delay by maximizing the allocation in the contention interval subject to a predetermined upper-bound on the data scheduling delay, wherein the upper-bound is dictated by a predetermined utilization of the data scheduler.

As will also be described, when the system is undergoing transient overload, the present invention minimizes data scheduling delay while keeping the contention access delay bounded by maximizing the allocation in the data interval subject to the minimum allocation needed to maximize contention throughput in accordance with the prevailing request offered load, so that instability of the system may be avoided.

In a frame-based contention-based reservation system, each frame consists of a number of slots, and is divided into two intervals for data and contention. It will be appreciated that the above-mentioned Szpankowski system is only optimized for a particular offered load and does not take into account changing offered loads. For the Dail, et al system, the system accommodates both contention-type traffic and reservation-type traffic by making room for reservation-type traffic. The net effect of making room for reservation-type traffic with a variable offered load is that the number of slots available for contention-type traffic and request contention in each frame is reduced and may vary from frame to frame. With respect to the method of Golmie et al, it is quite similar to the Dail et al system with the exception that, in one embodiment with the ratio of the average number of contention-type messages that are allocated data slots in a frame to the number of mini-slots in the contention interval of the frame being ⅓, the average contention-type message size is adjusted downward by a factor of 0.5, and in another embodiment with the same ratio being ½, no contention slot is allocated when the number of data slots pending allocation exceeds; 2.5 times the remaining number of data slots in the frame. It will be appreciated that the method of Dail, et al., and the methods of Golmie, et al., do not take into account varying request offered load associated with the contention-type traffic.

With respect to the Sala et al system, the frameless protocol system in which data slots are normally given priority over contention mini-slots, additional Contention mini-slots are forced between data slots to maximize contention throughput. At high data load, the method converges to allocating an average of e contention mini-slots per data slot. However Sala et al provides a frameless system which is counter to the DOCSIS frame based protocol. The Sala et al protocol assumes one can allocate slots on a slot-by-slot basis, where as the DOCSIS protocol assumes allocation on a frame-by-frame basis.

The differences between the subject system and the Sala et al system are first that the subject system is frame-based, secondly, in Sala et al the data slots are normally given priority over the contention mini slots. In the subject system no such priority is established, thereby permitting a more forward looking system which can balance data with respect to the contention slots.

Moreover, in the subject system attempts are made to equate the supply and demand of mini slots for data transmission. Under transient overload the method maximizes contention throughput, with the leftover slots being included in contention interval of the frame.

Because the subject system can take into account changes in request offered load, the request offered load is used to determine the number of contention opportunities.

With respect to the supply and demand of slots for data transmission, it will be seen that the demand is a function of request offered load.

Since the supply and demand functions set the operating point, the operating point of allocation of contention and data slots is directly related to the request offered load, unlike those of the prior of systems.

In the subject system where the supply and demand lines cross is the optimal operating point for the system. Once this point is set one supplies the remaining slots for data after one has allocated slots for contention. Conversely, demand bandwidth which needs to be allocated requires the transmission of data due to successful reservations. The supply line is a linear function that decreases with the number of contention opportunities. It will be appreciated that if there are very few contention opportunities, the amount of data that can be transmitted is greater. Conversely, if the number of contention opportunities increases greatly, the opportunity to transmit data decreases.

With respect to the demand, if one allocates more contention opportunities, one can have more successful reservations. This leads to a higher demand for data slots because bandwidth has been reserved.

If one operates with a number of contention opportunities such that it is greater than the number at the crossing between the supply and the demand curves, the demand is in excess of the supply. What this means is that one is allocating too many contention opportunities vis a vis slots for data transmission. Thus the data scheduling delay is high.

Conversely, if one operates with a number of contention opportunities such that it is smaller than the number at the crossing between the supply and the demand curves, the supply is in excess of the demand. What this means is that one is allocating too many slots for data transmission vis a vis contention opportunities. In this case the contention access delay will be high.

The subject system by taking into account the changes in the request offered load permits one to set an optimal point, which is the balancing of the number of slots allocated for contention opportunities vis a vis the number of slots allocated for data transmission.

In one embodiment, under normal operations, one can minimize the contention access delay in terms of $\rho$, where $\rho$ represents the utilization of the data scheduler. Specifically, one can determine the maximum allocation for contention without exceeding the allocation at the crossing between the supply and the utilization-adjusted demand curves, such that $\rho$=demand/supply.

The data scheduling delay is a function of $\rho$. Therefore by taking into consideration $\rho$, the data scheduling delay can be taken into consideration without having to specify the data scheduling algorithm. Thus if one specifies a data scheduling algorithm, one can describe the data scheduling delay in terms of $\rho$.

In one embodiment, when the system is overloaded, one can minimize the data scheduling delay while keeping the contention access delay bounded. Specifically, contention access delay may be bounded by allocating at least the number of slots in the contention interval of a frame to maximize contention throughput in accordance with the prevailing request offered load. Data scheduling delay is then maximized by allocating all the remaining slots in the frame for data transmission.

What respect to the balanced solution, the curve specified indicates that for a given request offered load one can determine the desired number of contention opportunities. Note that when the request offered load is very small, there is a small demand of slots for data transmission. Therefore, there is plenty of room to put in more contention opportunities. As one puts in more contention opportunities, one reduces contention access delay because the chance of colliding is smaller.

As will be described, in one method in order to provide a balance, one utilizes a piece-wise linear approximate lower bound of balanced allocation. What this establishes is that when a request offered load is low, there is not much demand for data transmission, and there are not many reservations. This means that you have room for more contention opportunities which in turn lowers the probability of collision. As a result the contention access delay is lowered. Given a request offered load, which is either estimated or actual, one can then ascertain a number of contention opportunities to allocate in the frame.

It will be appreciated that the difference between the present system and the prior systems is that the request offered load in the prior systems is assumed to be static, whereas the request offered load in the present system is assumed to be subject to slow changes. The assumption that the request offered load is static results in a fixed allocation and is not responsive to current loading conditions.

More generally, a need remains for a method and a device for allocating bandwidth dynamically to adapt to changing request offered load in a contention-based reservation protocol used in a slotted shared medium communication network, wherein transmission slots are allocated on a frame by frame basis.

SYSTEM MODEL

The present invention provides a method and a device for allocating bandwidth dynamically to adapt to changing offered load in a contention-based reservation protocol used in a slotted shared medium communication network, wherein transmission slots are allocated on a frame by frame basis.

The present invention determines how each of a stream of transmission frames on a shared medium channel is to be divided between a contention interval and a data interval, so that bandwidth allocation is efficient, thus to reduce transmission delays. User data is transported over the network in protocol-dependent units known as packets. In accordance with the present invention, each contention request requires a predetermined fixed number of slots for transmission, and this fixed number is denoted R. In accordance with the present invention, each data packet requires a random number of slots for transmission, and the average value of this random number is denoted H. Each successfully transmitted request in a contention interval of a given frame results in a reservation of an average of H slots in one or more future frames for data transmission. It is assumed that H is known a priori, or can be estimated. The method for estimating H is beyond the scope of the present invention.

In accordance with the present invention, the following variables be defined with respect to frame k (i.e., one identified to be the $k^{th}$ frame in the stream of transmission frames). T[k]=number of slots in frame k. M[k]=number of slots in the contention interval of frame k. W[k]=number of slots in the data interval of frame k.

The number of contention opportunities allocated in frame k is given by M[k]/R. Although M[k] is typically selected such that M[k]/R is an integer, it is heuristically treated as being a real number for the purpose of simplified analysis. When M[k]/R is not an integer, the number of contention opportunities allocated in frame k is set to an integer value that is nearest to and smaller than M[k]/R.

Figure 3:
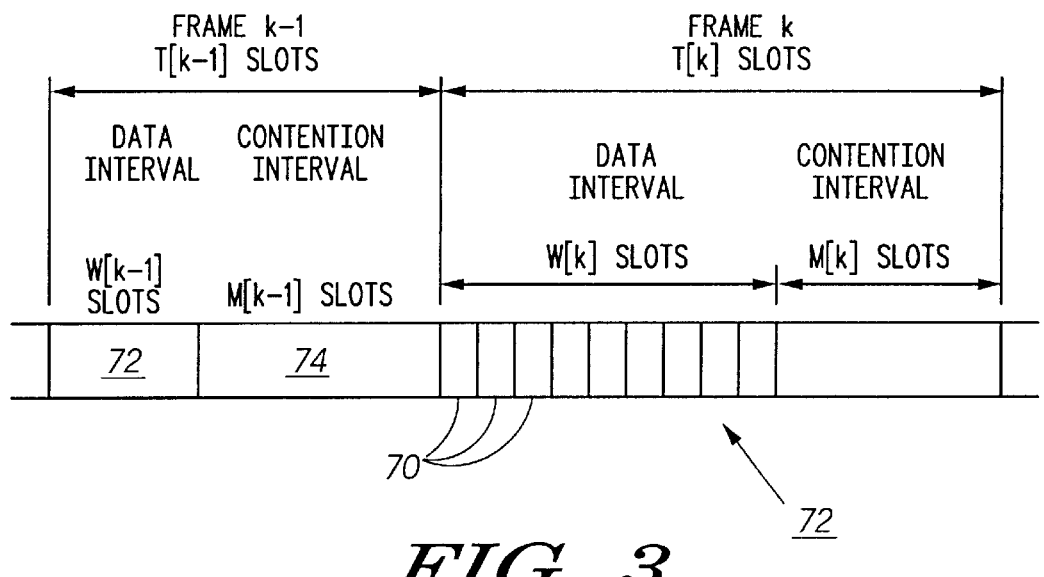
FIG. 3 is a diagrammatic representation showing a transmission frame structure in accordance with the present invention.

Referring to FIG. 3, each packet requires a number of slots 70 in a data interval 72 for transmission. Data transmission is via reservation, primarily through contention-based transmission of a request in a contention interval 74. Here a data interval is designated W, whereas a contention interval is designated M. A request generated at a given time may not be transmitted in a previously scheduled contention interval, but must wait for the next scheduled contention interval. As will be seen, the allocation in the current frame is determined based on the request offered load in the previous frame.

In accordance with the present invention, the following variables are defined with respect to frame k (i.e., one identified to be the kth frame in the stream of transmission frames). For simplicity, and without loss of generality, each frame is assumed to be completely divided into a contention interval and a data interval, so that the number of slots in the data interval of frame k is given by W[k]=T[k]-M[k]. Additional intervals for control overhead or other applications are not included in the description of the present invention. It is straightforward for one skilled in the art to account for these omitted intervals. For example, Dail, et al., teach how one could account for data slots that are allocated to traffic that does not require contention-based reservation.

In accordance with the present invention, each data packet fits in an integral multiple of slots, and may be fragmented at any slot boundaries, wherein fragmentation is a process whereby a data packet is divided into a plurality of packet fragments, which are transmitted as packets of smaller sizes. The first assumption may result in an overestimation of the size of a data packet by at most one slot, but this inefficiency is inherent in a slotted system. The second assumption minimizes the effect of the constraint due to frame-based allocation at the expense of fragmentation overhead that is not explicitly accounted for. It is straightforward for one who is skilled in the art to relax the above assumptions, without deviating from the spirit of the present invention.

In accordance with the present invention, the population of users collectively and randomly generate requests with a request offered load, that is quasi-static, i.e., the request offered load may change slowly with time. Let g[k] denote the offered load in frame k, i.e., the number of requests generated per slot in frame k. This; offered load may be known a priori, or estimated as proposed by the aforementioned teaching of Abi-Nassif, et al. Let G[k] denote the effective request offered load in frame k, i.e., the number of pending requests per contention opportunity in frame k. When a request is generated in a given frame, it must wait until the next frame for transmission. The expected number of requests generated in frame k-1 is g[k-1]T[k-1]. It follows that G[k]

$$= \frac{g[k-1]T[k-1]}{N[k]}.$$

A transmitted request may be successfully received by the headend, or collide with requests simultaneously transmitted by other users. It is assumed that a contention resolution algorithm, such as the truncated binary exponential back off algorithm, is used to resolve collisions. It is also assumed that the contention resolution algorithm is designed such that the probability of a retransmission in each slot is small, so that the contention-based multiple access for requests can be modeled by the well-known Slotted Aloha model.

Following the Slotted Aloha model, the throughput in the contention interval is S[k]=G[k] exp{-G[k]} whose maximum value is 1/e=0.3679. It can be verified that the maximum throughput is 1/e, and is achieved when G[k]=1, which implies that for a given request offered load g[k-1] and frame size T[k-1] for frame k-1, the allocation of M[k] slots in the contention interval of frame k maximizes the throughput in the contention interval, provided M[k]=g[k-1]T[k-1]R. In other words, maximum contention throughput is achieved in a frame when the number of contention opportunities in the frame is equal to the expected number of requests generated in the previous frame.

Figure 4:
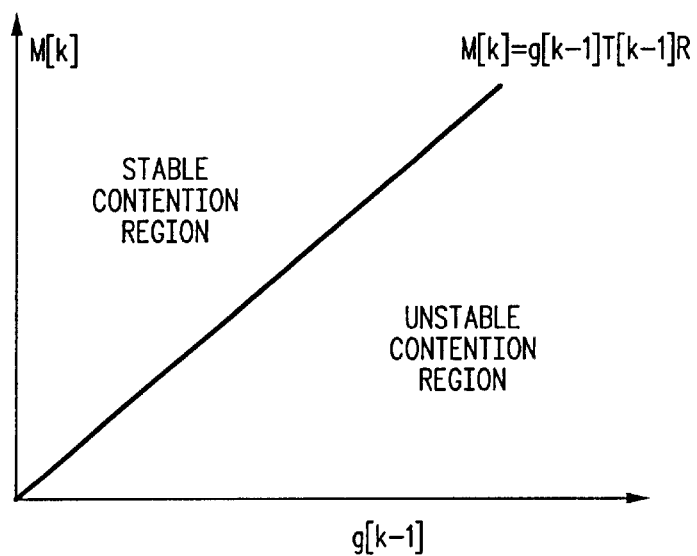
FIG. 4 is a diagrammatic representation showing the stable and unstable regions for contention access in accordance with the present invention.

FIG. 4 shows the above allocation that maximizes contention throughput, wherein the allocation is a linear function of request offered load. Specifically, it shows that the allocation is proportional to the request offered load. Above the line is a stable contention region indicating that there are sufficient contention opportunities to accommodate the request offered load. Below the line is an unstable contention region in which there are insufficient contention opportunities to accommodate the request offered load.

It is to be noted that exp{-G[k]} is the probability of a successful transmission of a request in a contention opportunity in frame k, i.e., there is exactly one request transmitted in the contention opportunity. When G[k]=1, this probability of success is equal to 1/e.

The overall multiple access delay for a data packet consists of contention access delay, which is the time from the generation of the request to reserve slots for transmission of the data packet to the time the request is successfully transmitted and accepted by the headend, and data scheduling delay, which is the delay from the time the request is accepted by the headend to the time the data packet is completely transmitted on the channel.

When the offered load is low, it is not necessary to allocate a large contention interval in a transmission frame in order to maximize contention throughput, for there would be many idle contention opportunities. Nevertheless, there may be little use of unreserved slots since there is not much data traffic due to low offered load. In accordance with the first embodiment of the present invention, whenever there are unreserved slots left in a frame after an initial allocation of a number of slots to the contention interval of the frame to maximize contention throughput and a number of slots for data transmission, the leftover slots are additionally included in the contention interval. It is to be noted that this approach improves contention access delay without increasing data scheduling delay in any appreciable amount.

When the request offered load is high, the contention interval must be large accordingly to maximize contention throughput, or many transmitted requests would collide with one another. Maximizing contention throughput when the request offered load is high implies that contention opportunities are given higher priority than data transmission opportunities in the allocation of upstream bandwidth. This could result in unbounded data scheduling delay. It is assumed that an appropriate admission control mechanism is used to avoid or minimize the chance of the system operating with excessive offered load, both request and data. In the event that the system is overloaded momentarily, the transient effect is a temporarily increase in data scheduling delay. Piggybacking may also help to bring the system back to operation with normal offered load.

Each successful request from a user corresponds to a reservation for a data transmission opportunity that would accommodate the size of the packet that the user would like to transmit. The larger the average size of packets relative to the size of a request, the more bandwidth must be allocated to the data interval relative to the contention interval, and vice versa. Hence, efficient bandwidth allocation must depend not only on the offered load of reservation requests but also distribution of packet sizes.

SUPPLY AND DEMAND OF SLOTS FOR DATA TRANSMISSION

The central idea of the approach is based on balancing supply and demand of slots for data transmission.

Figure 5:
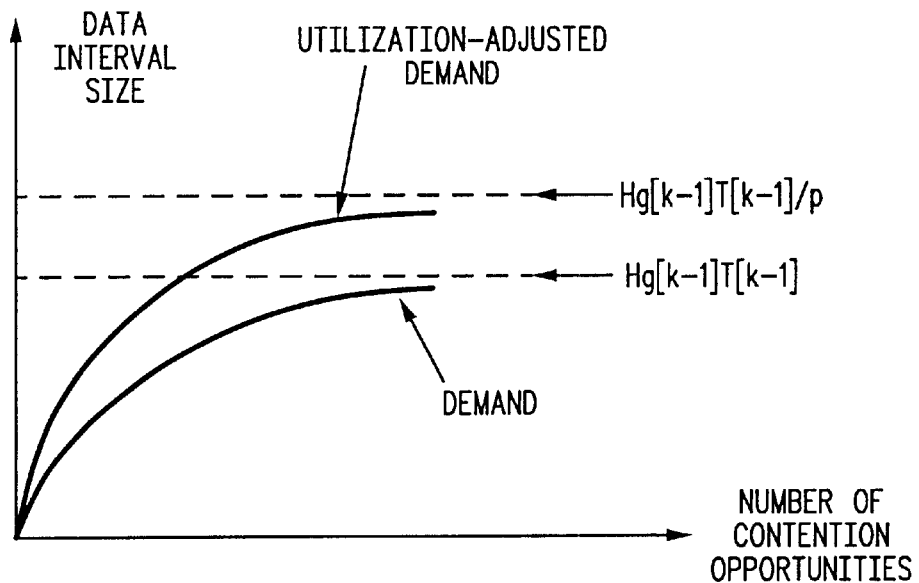
FIG. 5 is a diagrammatic representation showing demand of slots for data transmission.

As illustrated in FIG. 5, the demand of slots for data transmission increases with the number of contention opportunities allocated up to an asymptotic: value because of decreasing probability of collision. As will be seen hereinafter, the original demand curve will be adjusted upwards to take into account the utilization of the data scheduler used for scheduling data transmissions. The result is a new demand curve called a utilization-adjusted demand curve.

Figure 6:
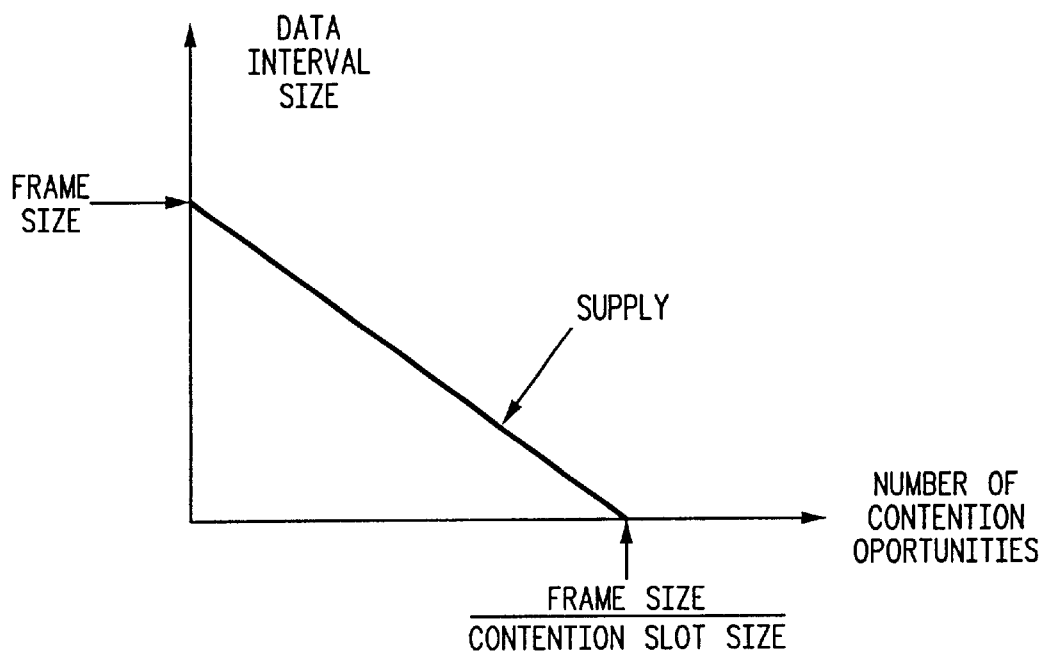
FIG. 6 is a diagrammatic representation showing the supply of slots for data transmission.

As illustrated in FIG. 6, due to conservation of available upstream bandwidth, the supply of slots for data transmission decreases linearly as an increasing number of contention opportunities are allocated. As will be seen hereinafter, this supply of slots for data transmission represents the bandwidth available for data transmission given the allocated number of contention opportunities. If too many contention opportunities are allocated, data scheduling delay can be high because there is not enough bandwidth for data transmission.

In principle, for a given set of system parameters, there exists an operating point such that the supply and demand of slots for data transmission are equal. As will be seen hereinafter, this operating point forms the basis for allocating contention opportunities based on supply and demand of slots for data transmission.

The demand of slots for data transmission due to requests that are successfully transmitted in a frame is proportional to the expected number of successfully transmitted requests in the contention interval of the frame as well as the average number of slots reserved per successfully transmitted request. The expected number of successful request transmissions in the contention interval is a product of the number of contention opportunities in the contention interval and the contention throughput achieved. Let D[k] denote the demand of slots for data transmission due to requests that are successfully transmitted in frame k-1. Then, $$D[k] = \frac{HS[k]M[k]}{R} =$$
$$Hg[k-1]T[k-1]\exp\left\{\frac{g[k-1]T[k-1]R}{M[k]}\right\} \leq Hg[k-1]T[k-1]$$

It is to be noted that, for a given offered load, this demand of slots for data transmission in the frame increases with the number of contention opportunities in the contention interval of the frame, from zero up to an asymptotic value. This asymptotic value is a product of the average number of slots reserved per successfully transmitted request and the expected number of requests generated in the previous frame.

Given that the desired utilization for the data scheduler is ρ, the effective number of slots needed to satisfy the demand D[k] is D[k]/ρ. From here on, D'[k]=D[k]/ρ, and this utilization-adjusted demand may be referred to simply as demand when the context is clear that its dependence on ρ is taken into consideration.

Given a finite number of slots in a frame, the more slots are allocated in the contention interval of the frame, the fewer slots are available for data transmission. Thus, the supply of slots for data transmission in a frame decreases linearly with the number of slots allocated in the contention interval of the frame. Let C[k] denote the supply of slots for data transmission in frame k. Then, C[k]=T[k]−M[k]

The demand of slots for data transmission increases with the number of slots allocated to the contention interval because of decreasing probability of collision. Due to conservation of available upstream bandwidth, the supply of slots for data transmission decreases as an increasing number of slots are allocated to the contention interval.

Conceptually, the headend maintains a queue of reserved slots for data transmission. The demand of slots for data transmission represents an in-flow to the queue, whereas the supply of slots for data transmission represents an out-flow from the queue. For a stable operation of the queue, the in-flow must not exceed the out-flow. The central idea of the present invention is the balancing of supply and demand of slots for data transmission, wherein a given data scheduler is used for allocating slots among data packets and the operation of the data scheduler is subject to a predetermine utilization. It is to be noted that the utilization of the data scheduler is related to the ratio of demand to supply of slots for data transmission. Provided that this ratio is smaller than 1, demand will not exceed supply of slots for data transmission, and data scheduling delay will be bounded.

It is to be noted that the supply curve and the utilization-adjusted demand curve intersects with each other at an operating point with a unique number of contention opportunities allocated to a contention interval of a frame. At this unique operating points, C[k]=D'[k], i.e., the supply and demand of slots for data transmission are balanced with each other. Hence, the contention allocation that balances supply and demand of slots for data transmission, when offered load is g[k−1], is a solution to the following implicit function of M[k]:

$$M[k] = T[k] - (g[k-1]T[k-1]H/\rho)\exp\left\{-\frac{g[k-1]T[k-1]}{RM[k]}\right\}$$

The above expression is henceforth referred to as a balanced equation, and the solution to the balanced equation is referred to as a balanced solution. The balanced solution is a solution to the balanced equation that is derived from equating supply and utilization-adjusted demand of slots for data transmission. For each request offered load, the balanced solution determines the desired numbers of slots to be allocated in the contention interval and data interval respectively.

Figure 7:
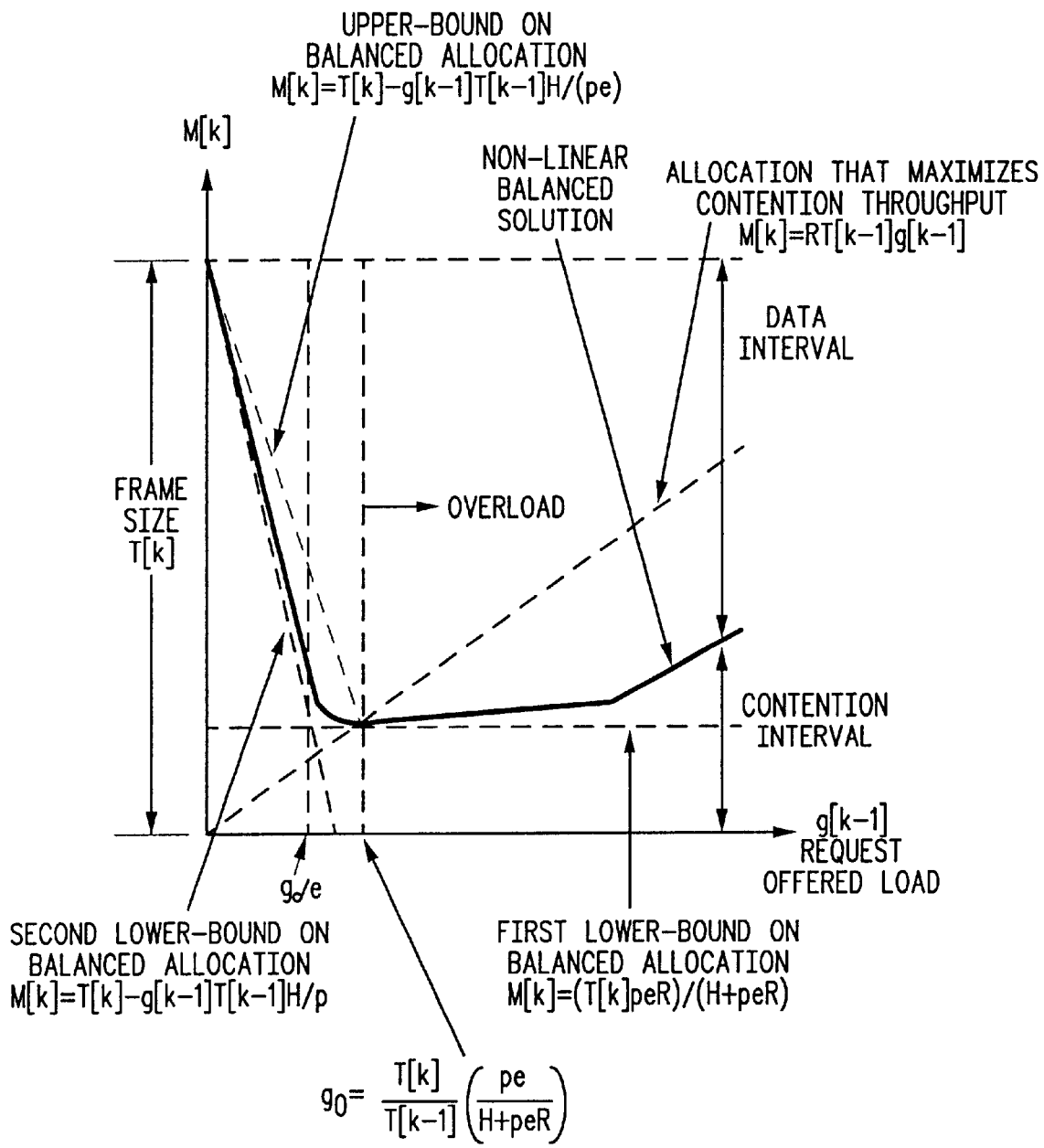
FIG. 7 is a diagrammatic representation showing the balanced solution and its piece-wise linear bounds.

FIG. 7 shows a graph of the non-linear balanced solution for frame k plotted against g[k−1], the request offered load in frame k−1. For operating points beneath the curve, supply exceeds demand, and there is a surplus of data slots. For operating points above the curve, demand exceeds supply, and there is a deficit of slots for data transmission.

It will be appreciated that, since $\rho \leq 1$, $C[k]=D'[k]=D[k]/\rho$ implies that $D[k]/C[k]=\rho \leq 1$. Thus, for $\rho \leq 1$, the balanced equation ensures that in-flow to the headend's queue of reserved slots for data transmission does not exceed out-flow from the queue, so that data scheduling delay could be bounded.

It is to be noted that the balanced solution is a function of H, R, $\rho$, T[k], T[k−1], as well as g[k−1], the request offered load. Given the values of H, R, $\rho$, T[k], T[k−1], and g[k−1], the balanced equation can be solved numerically.

It can be verified that the balanced solution for frame k is a convex function of the request offered load in frame k−1, wherein the function has a single well-defined minimum value, has a value T[k] when there is no request offered load, is non-increasing for request offered load g[k−1] up to the point at which the function achieves the minimum value, and non-decreasing for larger request offered load g[k−1].

BOUNDS ON BALANCED SOLUTION

Since the solution to the balanced equation is non-linear, it is computationally involved to determine this solution. In the various embodiments of the present invention, simple piece-wise linear or linear functions are used to approximate the non-linear solution.

By taking the derivative of M[k] in the balanced equation, with respect to g[k−1], and setting the derivative to zero, one can arrive at the conclusion that the minimum of the balanced solution, with respect to g[k−1], is achieved when G[k]=g[k−1]T[k−1]R/M[k]=1, that is M[k]=g[k−1]T[k−1]R must be satisfied when the balanced solution is minimized. It will be appreciated that this allocation for contention coincides with the allocation that is needed to maximize contention throughput.

By the Slotted Aloha assumption, throughput in the contention interval can be stable for $G[k] \leq 1$. In other words, contention access delay can be bounded when M[k]=g[k−1]T[k−1]R.

It can be verified that the balanced solution is minimized when $$g[k-1] = g_o = \frac{T[k]}{T[k-1]} \frac{\rho e}{H + \rho eR}.$$

Let $\frac{\rho e}{H + \rho eR}$ be represented by b(H, R, $\rho$), and thus $g_o$=b(H, R, $\rho$)T[k]/T[k−1].

It will be appreciated that the multiplicative inverse of b(H, R, $\rho$) may be interpreted as an expected number of slots required per reservation attempt, wherein R slots are required for a contention opportunity and H/($\rho$e) slots are expected for data transmission. The expected number of slots required for data transmission per reservation attempt is H/($\rho$e) because H/$\rho$ slots are required with a probability 1/e (i.e., probability of success) and no slot is required with a probability (1−1/e).

It can be verified that, when g[k−1]=$g_o$, the balanced solution results in M[k]=b(H, R, $\rho$)T[k]R=$g_o$T[k−1]R, which satisfies M[k]=g[k−1]T[k−1]R, i.e., the condition for contention throughput to be maximized. Thus, a first lower-bound on the balanced solution is $M[k] \geq b(H, R, \rho)T[k]R$ for $g[k-1] \geq 0$.

It will be appreciated that the above lower-bound on the balanced solution can also be derived as follows.

$$T[k] - M[k] =$$

$$\frac{HM[k]}{\rho R} \left\{ \frac{g[k-1]T[k-1]R}{M[k]} \right\} \exp\left\{ -\frac{g[k-1]T[k-1]R}{RM[k]} \right\} \leq \frac{HM[k]}{\rho eR}$$

It will be appreciated that the following relationship between W[k] and M[k] is a direct result of the above lower-bound.

$$W[k]/M[k] = \frac{H}{\rho eR}$$

Figure 8:
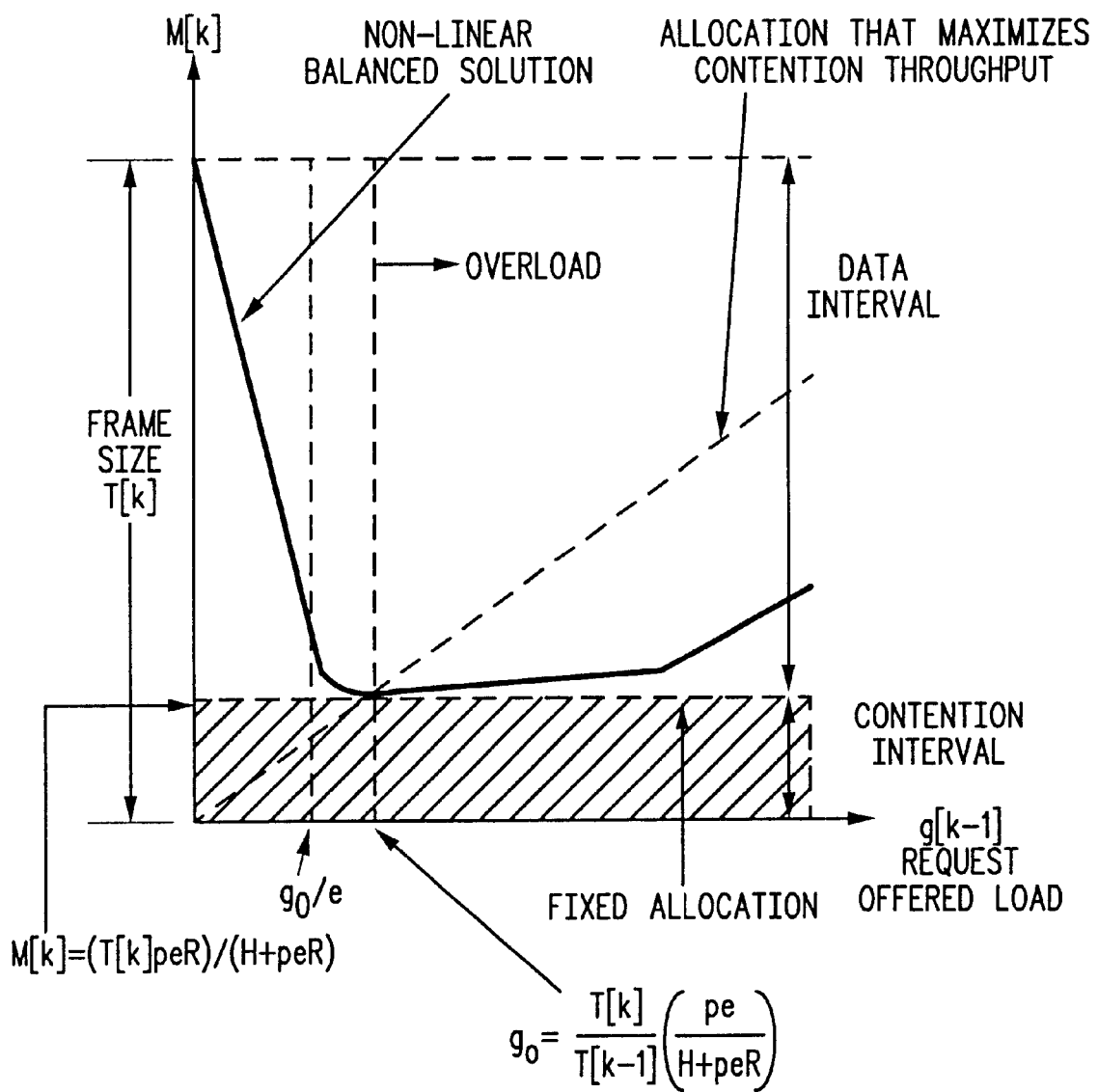
FIG. 8 is a diagrammatic representation showing fixed allocation.

FIG. 8 shows a method that allocates slots for contention and data in a frame such that the ratio of the size of the data interval to the size of the contention interval satisfies the above relationship. It will be appreciated that this method, which is independent of the request offered load, is similar to prior systems with fixed allocation.

When g[k−1]=$g_o$, W[k]=T[k]−M[k]=T[k]−b(H, R, $\rho$)T[k] R, which is the number of slots allocated in the data interval of frame k. It will be appreciated that this allocation results in maximum data throughput while balancing the supply and demand of slots for data transmission, because the balanced solution achieves its minimum when g[k−1]=$g_o$. It can be verified that this maximum data throughput is H/(H+$\rho$eR), which tends to 1 for H>>$\rho$eR.

It can be verified that, when g[k−1]>$g_o$, the balanced solution is bounded from above by the contention throughput maximizing allocation M[k]=g[k−1]T[k−1]R, and hence the balanced solution could result in high contention access delay. In this respect, the particular offered load go is referred to as an overload threshold.

As discussed before, the balanced solution is equal to T[k] when g[k−1]=0, and satisfies M[k]=b(H, R, $\rho$)T[k]R when g[k−1]=$g_o$=b(H, R, $\rho$)T[k]/T[k−1]. For $0 \leq g[k-1] \leq g_o$, the balanced solution is bounded from below by b(H, R, $\rho$)T [k]R=$g_o$T[k−1]R$\geq$g[k−1]T[k−1]R. Thus, starting with the balanced equation, we obtain an upper-bound on the balanced solution, $M[k] \leq T[k]-g[k-1]T[k-1]H/(\rho e)$, and a second lower-bound on the balanced solution, $M[k] \geq T[k]-g[k-1]T[k-1]H/\rho$, The lower-bound is derived with g[k−1]=$g_o$=b(H, $\rho$)T[k]/T[k−1] and M[k]=b(H, R, $\rho$)T[k]R, whereas the upper-bound is derived with g[k−1]<<$g_o$=b(H, R, $\rho$)T[k]/T [k−1] and M[k]$\geq$b(H, R, $\rho$)T[k]R.

It can be verified that, as g[k−1] tends to zero, the above lower-bound on the balanced solution is tight. It is to be noted that the above upper-bound intersects with M[k]=b(H, R, ρ)T[k]R when g[k−1]=$g_0$, whereas the lower-bound intersects with M[k]=b(H, R, ρ)T[k]R when g[k−1]=$g_0$/e.

Since M[k]≧b(H, R, ρ)T[k]R for all values of g[k−1], the lower-bound can be modified as follows. M[k]≧max {b(H, R, ρ)T[k]R, (T[k]−g[k−1]T[k−1]H/ρ)}. Equivalently, for g[k−1]≦$g_0$/e, M[k]≧T[k]−g[k−1]T[k−1]H/ρ and, for $g_0$,e<g[k−1]≦$g_0$, M[k]≧b(H, R, ρ)T[k]R.

It can be verified that the balanced solution satisfies a second lower-bound as follows.

$$M[k] \geq T[k] - g[k-1]T[k-1]H/\rho.$$

It will be appreciated that the above lower-bounds are both linear functions of request offered load, although the first one is a degenerate case. It can be verified that these two linear functions intersect when the request offered load is equal to $g_0$/e.

FIG. 7 shows the balanced solution in accordance with the present invention. It is to be noted that the balanced solution starts with the frame size when there is no request offered load, decreases almost linearly as request offered load increases, reaches a minimum when the request offered load is at the overload threshold, and then increases gradually as the request offered load rises above the overload threshold.

FIG. 7 also shows various bounds on the balanced solution in accordance with the present invention. The balanced solution is bounded from above by a decreasing linear function in the non-overload region, and the allocation that maximizes contention throughput in the overload region. The balanced solution remains above the first lower-bound for all request offered load. When the request offered load is light, the second lower-bound is a much tighter bound.

REGIONS OF REQUEST OFFERED LOAD

It will be appreciated that the various bounds on the balanced solution define three regions of request offered load. The first region represents a light load region in which the demand of slots for data transmission is low so that more contention opportunities may be allocated. The second region represents a moderate load region in which the minimum allocation required to balance supply and demand of slots for data transmission is approached. The lower threshold for the second region is determined by the crossing of the first and second lower-bounds on the balanced solution. The third region represents an overload region in which balancing supply and demand of slots for data transmission can lead to instability of the system, such that insufficient contention opportunities are allocated.

More specifically, the overload threshold go, which is equal to b(H, R, ρ)T[k]/T[k−1], divides the request offered load into an overload region where g[k−1]≦$g_0$, and a non-overload region where g[k−1]>$g_0$.

When g[k−1]=$g_0$, the balanced solution achieves its minimum value, and maximizes contention throughput.

For g[k−1]<$g_0$, maximizing contention throughput will result in supply exceeding demand for data transmission opportunities, and some data transmission opportunities would be wasted. In this case, it is affordable and desirable to allocate more transmission opportunities for requests to minimize contention access delay, even though contention throughput may not be at its maximum. It will be appreciated that the balanced solution indeed allocates more slots for contention than needed for maximizing contention throughput when the system is non-overloaded.

For g[k−1]>$g_0$, maximizing contention throughput will result in demand exceeding supply for data transmission opportunities, and data scheduling delay will consequently be excessive. Balancing the supply and demand of slots for data transmission requires allocating a smaller number of contention opportunities than that required for maximizing contention throughput. This can lead to an increase in the number of collisions in each frame, and hence an increase in contention access delay. Consequently, many unsuccessful requests would backoff and be retransmitted later. This would result in a further increase in the request offered load, leading to inefficient utilization of the upstream bandwidth. It is thus not desirable to balance supply and demand of slots for data transmission in the overload region.

When the system is operating in the overload region, the contention interval must be large to maximize contention throughput, or many transmitted requests would collide with one another. However, maximizing contention throughput when the system is overloaded implies that contention opportunities are given higher priority than data transmission opportunities. This could result in excessive data scheduling delay. In accordance with the present invention, it is deemed important to maximize contention throughput in an event of transient overload at the expense of a temporary increase in data scheduling delay.

It is thus desirable that an appropriate admission control mechanism is used to avoid or minimize the chance of the system operating with excessive offered load. In the event that the system is overloaded momentarily, the transient effect is a temporarily increase in data scheduling delay. Piggybacking may also help to bring the system back to operation with normal offered load.

There are a number of ways to avoid or minimize the chance of operating in the overload region. One way is to limit the population of users by an appropriate admission control algorithm. Another way is to drop requests that have already been retransmitted up to a maximum permissible number of times. Yet another way is to selectively drop data packets. Obviously, the above alternative methods are not mutually exclusive. Methods for avoiding operation in the overload region are beyond the scope of this invention.

It will be appreciated that, for request offered load in the range 0≦g[k−1]≦$g_0$/e, the second lower-bound on the balanced solution is tight, especially for g[k−1] close to 0. It will be appreciated that, for request offered load in the range $g_0$/e≦g[k−1]≦$g_0$, the balanced solution is close to its minimum value, $g_0$T[k−1]R. It is useful to divide the non-overload region of request offered load into a light load region where 0≦g[k−1]≦$g_0$/e, and a moderate load region where $g_0$/e≦g[k−1]≦$g_0$. will be appreciated.

EMBODIMENTS OF THE PRESENT INVENTION

As will be seen, there are three embodiments of the present invention in which changing request offered loads are taken into consideration. The first embodiment specifies a method of allocation that maximizes contention throughput based on prevailing request offered load. The second embodiment specifies a method that enhances the first embodiment by taking into account the minimum allocation that is required for balancing supply and demand of slots for data transmission. The third embodiment specifies a method that even further enhances the second embodiment by fully taking into account the balanced solution to accommodate the situation in which the request offered load is low.

Figure 9:
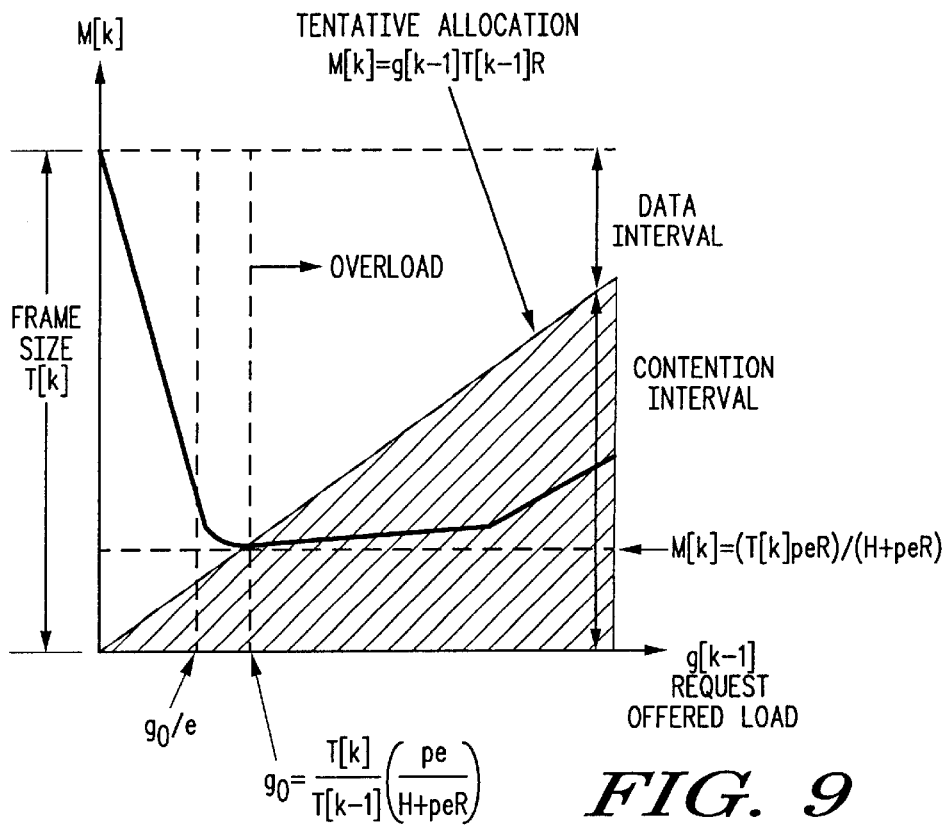
FIG. 9 is a diagrammatic representation showing the first embodiment of the invention in which the tentative allocation for contention slots is a straight line function.

FIG. 9 shows the first embodiment of the present invention, which allocates slots for contention and data in a frame such that contention throughput is maximized for any request offered load. This allocation is governed by a linear function of the request offered load, such that it has a value zero when there is no request offered load, and increases proportionally with request offered load otherwise.

In the first embodiment, the number of slots to be initially a.located in the contention interval of frame k maximizes the throughput in the contention interval. Specifically, $M[k]=g[k-1]T[k-1]R$, i.e., the number of contention opportunities in the frame is equal to the expected number of requests generated in the previous frame. It is to be noted that the line describing this allocation function divides the values of $M[k]$, for each value of $g[k-1]$, into a stable contention region and an unstable contention region.

Whenever there are unreserved slots left in a frame after initial allocation of this number of slots in the contention interval and remaining slots for data transmission, the leftover slots are additionally included in the contention interval. There may be leftover slots because either there may not be enough reserved slots pending allocation to fill up the remainder of the frame, or there may not be a perfect fit of data slots in the remainder of the frame.

It will be appreciated that the first embodiment takes into consideration the changing request offered load in allocating the number of slots for contention and data in each frame to maximize contention throughput, thereby enabling the system to operate with bounded contention access delay.

Figure 10:
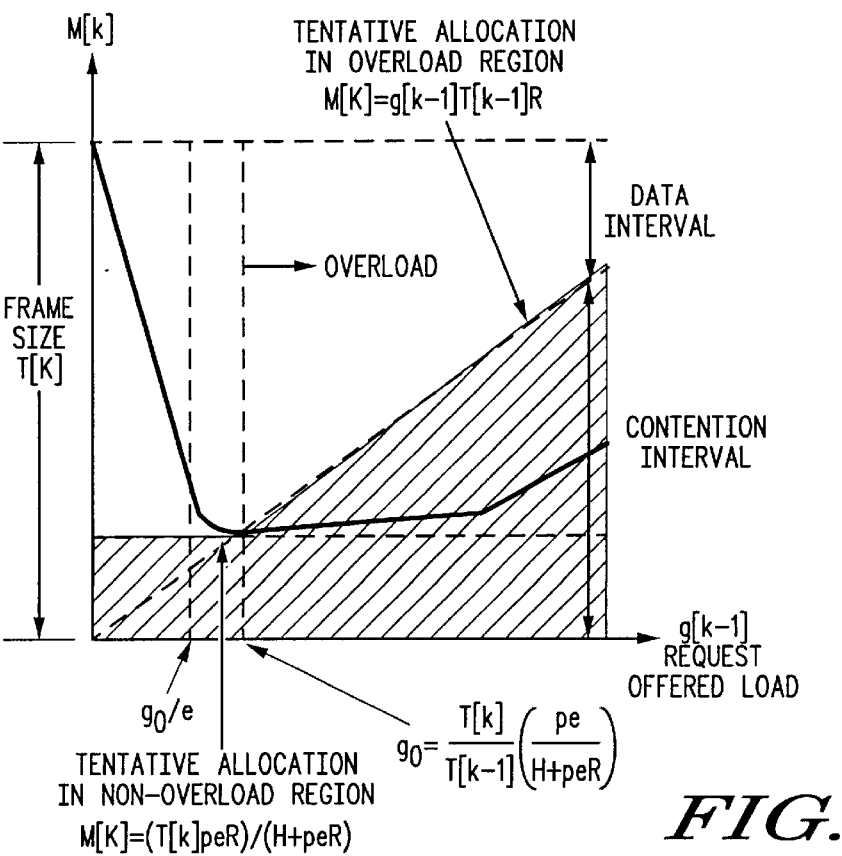
FIG. 10 is a diagrammatic representation showing the second embodiment of the invention in which the tentative allocation for contention slots is based on a piece-wise 2-segment linear function.

FIG. 10 shows the second embodiment of the present invention, which allocates slots for contention and data in a frame such that contention throughput is maximized when the system is in the overloaded region, and a minimum allocation for balancing supply and demand of slots for data transmission is guaranteed when the system is in the non-overload region. This allocation is governed by a piece-wise linear function of the request offered load, with two linear segments, such that it has a constant non-zero value for request offered load ranging from zero to the overload threshold and increases proportionally with request offered load otherwise.

In the second embodiment, the number of slots to be initially allocated in the contention interval of frame k is derived from a combination of the first lower bound on the balanced solution as well as the contention throughput maximizing function as follows.

$$M[k]=\max \{g[k-1]T[k-1]R, b(H, R, \rho)T[k]R\}$$

Equivalently, $M[k]=b(H, R, \rho)T[k]R$ for request offered load in the range $0<g[k-1]\leq g_0$, and $M[k]=g[k-1]T[k-1]R$ for higher request offered load.

It will be appreciated that the second embodiment of the present invention applies a different allocation for contention in each of the non-overload region and overload region of request offered load.

Should there be any leftover slots in the frame after allocating the remaining slots for data transmission, the leftover slots are included in the contention interval of the frame.

It will be appreciated that the second embodiment is a function of request offered load. It not only minimizes the chance for the contention-based reservation system to become unstable when the system is overloaded, but also lowers contention access delay at minimal expense of data scheduling delay when the system is non-overloaded.

Figure 11:
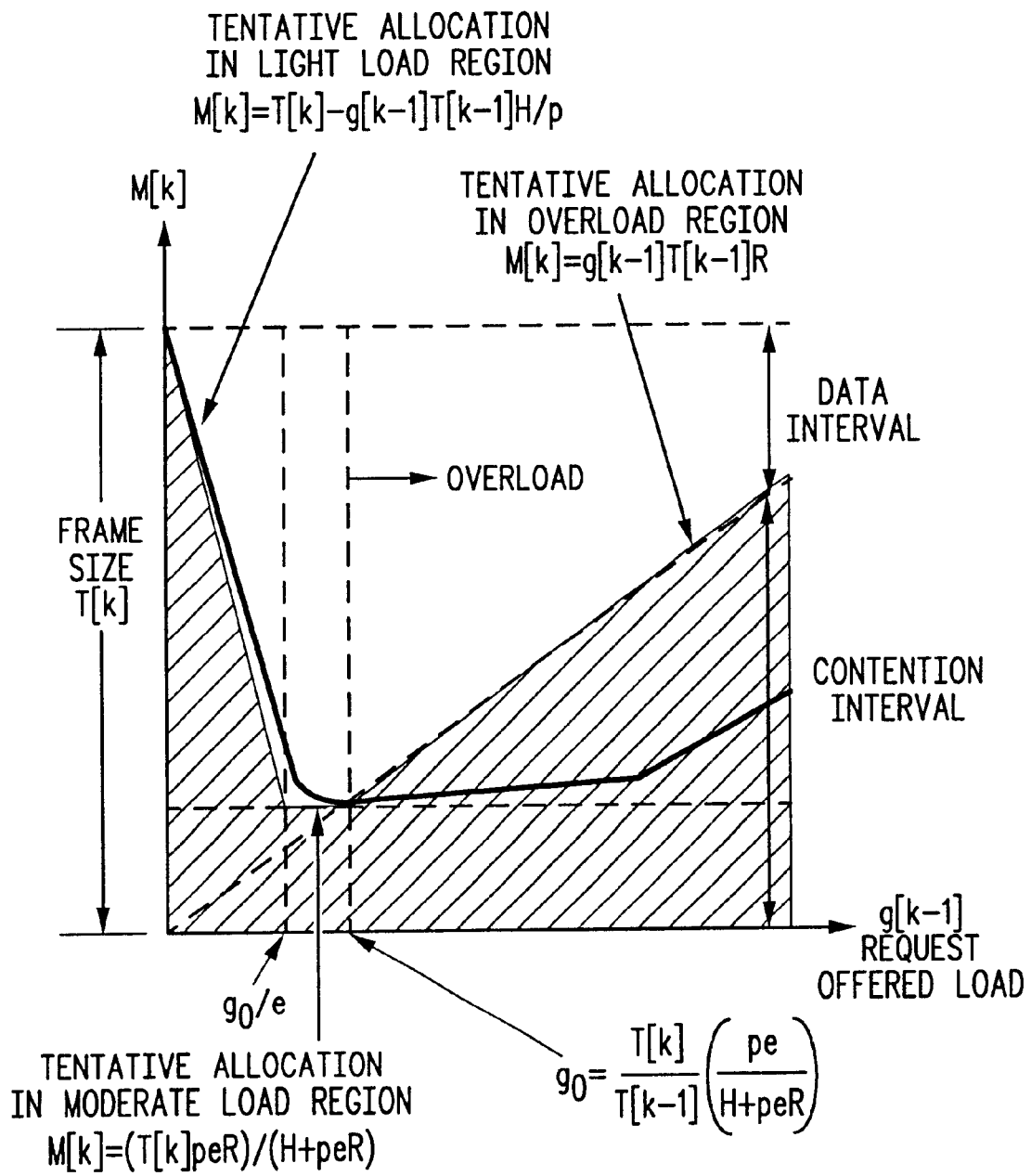
FIG. 11 is a diagrammatic representation showing the third embodiment of the invention in which the tentative allocation for contention slots is based on a piece-wise 3-segment linear approximation to fully take into account supply and demand.

FIG. 11 shows the third embodiment of the present invention, which allocates slots for contention and data in a frame such that contention throughput is maximized when the system is in the overloaded region, a minimum allocation is used to balance supply and demand of slots for data transmission is guaranteed when the system is in the moderate load region, and an allocation that approximately balances supply and demand of slots for data transmission is used when the system is in the light load region. Specifically, this allocation is governed by a piece-wise linear function of the request offered load, with three linear segments, such that its value decreases linearly in the light load region, has a constant non-zero value in the moderate load region, and increases proportionally with request offered load in the overload region.

In the third embodiment, the number of slots to be initially allocated in the contention interval of frame k is derived from a combination of the first and second lower bounds on the balanced solution as well as the contention throughput maximizing function as follows.

$$M[k]=\max \{g[k-1]T[k-1]R, b(H, R, \rho)T[k]R, (T[k]-g[k-1]T[k-1]H/\rho)\}$$

Equivalently, $M[k]=T[k]-g[k-1]T[k-1]H/\rho$ for request offered load in the range $0\leq g[k-1]\leq g_0/e$, $M[k]=b(H, R, \rho)T[k]R$ for request offered load in the range $g_0/e\leq g[k-1]\leq g_0$, and $M[k]=g[k-1]T[k-1]R$ for higher request offered load. It will be appreciated that the third embodiment of the present invention applies a different allocation for contention in each of the light load region, moderate load region, and overload region of request offered load.

Should there be any leftover slots in the frame after allocating the remaining slots for data transmission, the leftover slots are included in the contention interval of the frame.

It will be appreciated that the third embodiment is a function of request offered load. It not only minimizes the chance for the contention-based reservation system to become unstable when the system is overloaded, but also minimizes contention access delay while ensuring that data scheduling delay is bounded when the system is non-overloaded.

It is to be noted that in all the embodiments of the present invention where a tentative number of slots are allocated in the contention interval, the tentative allocation is conservative with respect to the allocation required for balancing supply and demand of slots for data transmission. It is possible that even leftover slots, if any, are included in the contention interval, it is not sufficient to result in an allocation that balances supply and demand of slots for data transmission. Provided that the request offered load is dynamically estimated, future allocation would adjust accordingly in response to surplus or deficit in the number of contention opportunities allocated.

The efficiency of the above embodiments of the present invention depends on the granularity of fragmentation. If the granularity of fragmentation is larger than a slot, or if fragmentation is not permitted, then there may be leftover slots, in the frame, which are not enough to accommodate any packet or packet fragment, pending transmission. It is also possible to occasionally overestimate the demand of slots for data transmission. In any event, whenever there are leftover slots in a frame, the leftover slots are included in the contention interval of the frame. In principle, to minimize inefficiency, the surplus in the supply of contention opportunities may be deducted from contention intervals of future frames. Nevertheless, this is not needed when the offered load is dynamically estimated, because future allocation would adjust accordingly in response to the surplus.

Figure 14:
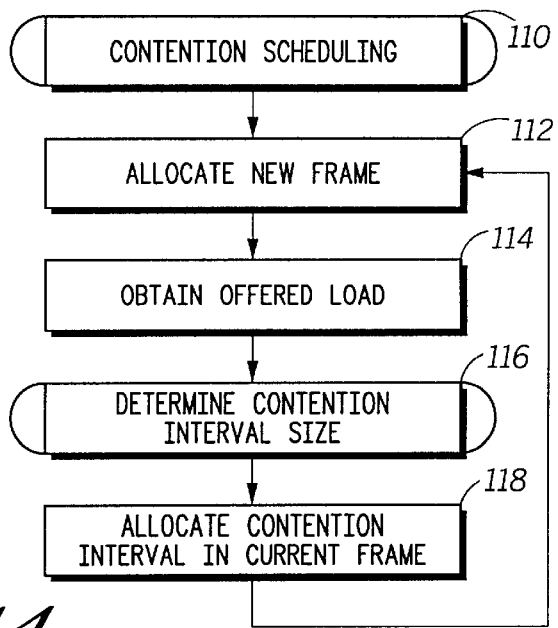
FIG. 14 is a flowchart describing contention scheduling based on request offered load.

Referring now to FIG. 14 what is shown is a flow chart describing contention scheduling. Here contention scheduling is initiated at 110 to allocate a new frame 112, thereafter to obtain offered load 114, which in this case is the requested offered load. Thereafter as illustrated at 116, the system determines contention interval size and then at 118 allocates the contention interval in the current frame.

Figure 15:
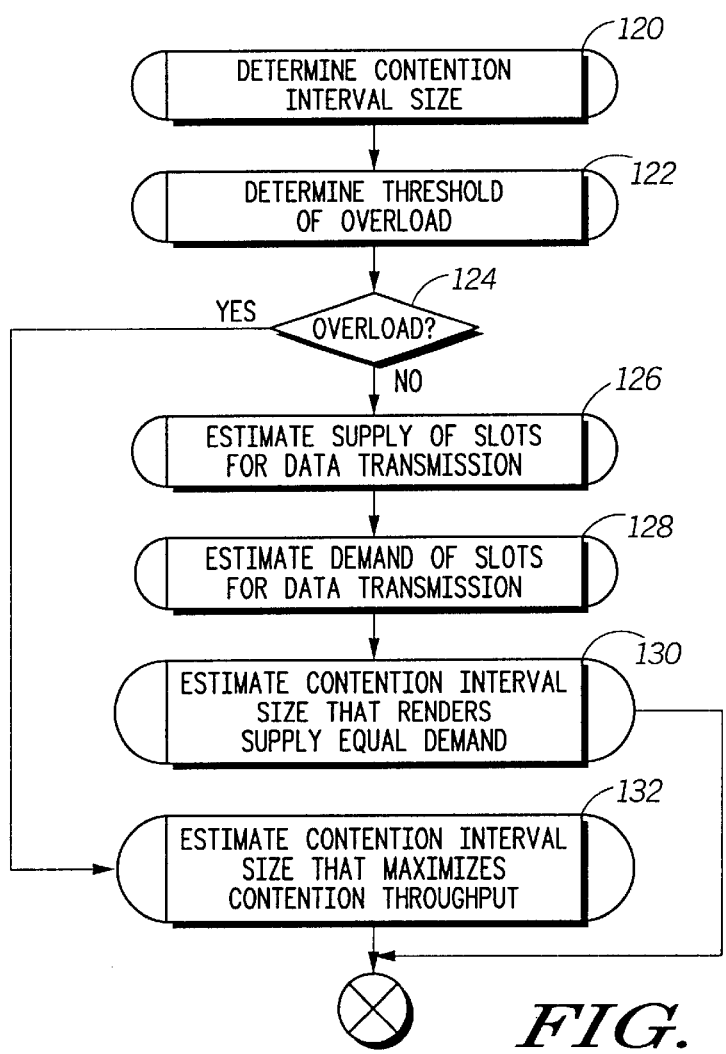
FIG. 15 is a flowchart describing a method for determining contention interval size.

Referring to FIG. 15, what is shown is a flow chart describing a method for determining contention interval size. Here illustrated at 120, a step initiates the determination of contention interval size. Thereafter the threshold of an overload is determined at 122 and if there is no overload, as illustrated at 124, the system estimates the supply of slots for data transmission as illustrated at 126. Thereafter, the system estimates the demand of slots for data transmission as illustrated at 128 and estimates the contention interval size that renders supply equal to demand as illustrated at 130.

If there is an overload condition as determined at 124, then as illustrated at 132 there is an estimation of the contention size that maximizes contention throughput in the overload condition.

Figure 16:
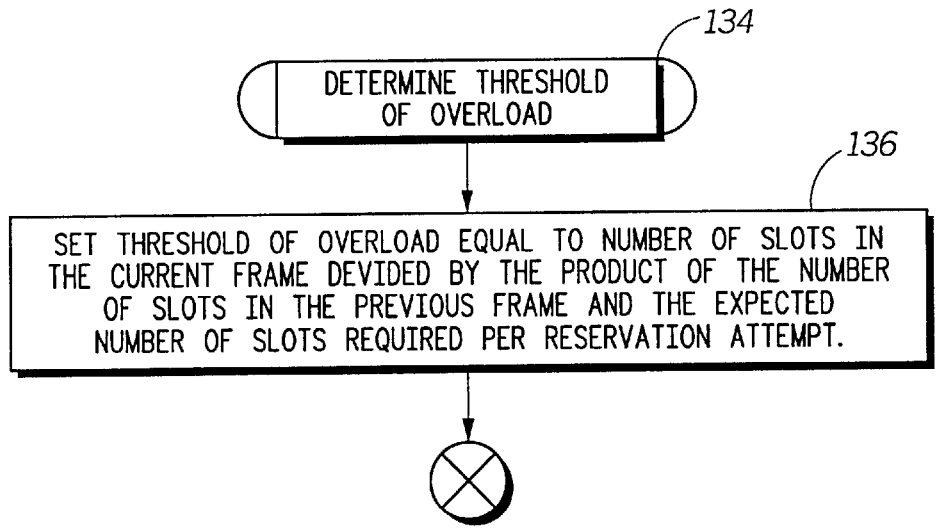
FIG. 16 is a flowchart describing a method for determining the threshold for an overload condition.

Referring to FIG. 16, what is shown is a flow chart describing a method for determining the threshold of an overload. Here, this is initiated at 134 and as illustrated at 136 the system sets the threshold overload equal to the number of slots in the current frame divided by the product of the number of slots in the previous frame and the expected number of slots required per reservation attempt.

Figure 17:
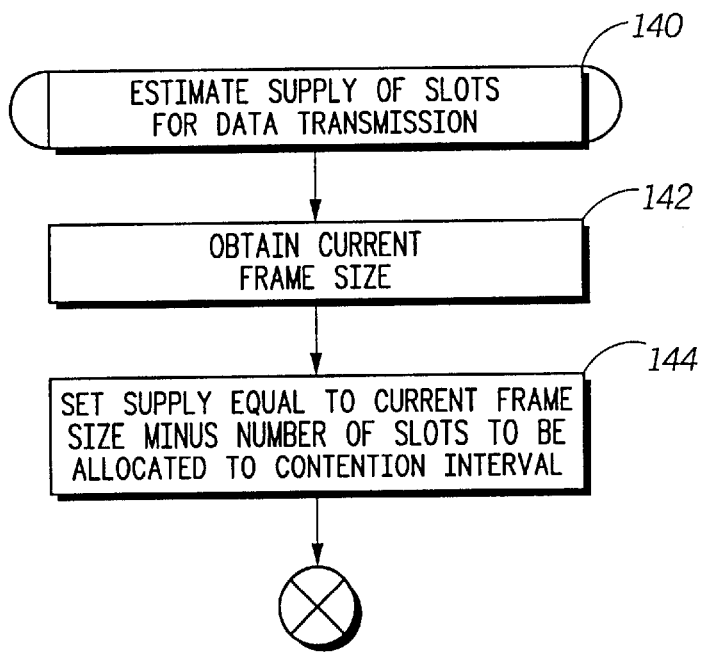
FIG. 17 is a flowchart describing a method for estimating the supply of slots for data transmission.

Referring to FIG. 17, what is shown is a flow chart describing a method for estimating the supply of slots for data transmission. Here the process is started at 140 and a current frame size is obtained at 142. Thereafter as illustrated at 144, the system sets the supply equal to the current frame size minus the number of slots to be allocated to the contention interval.

Figure 18:
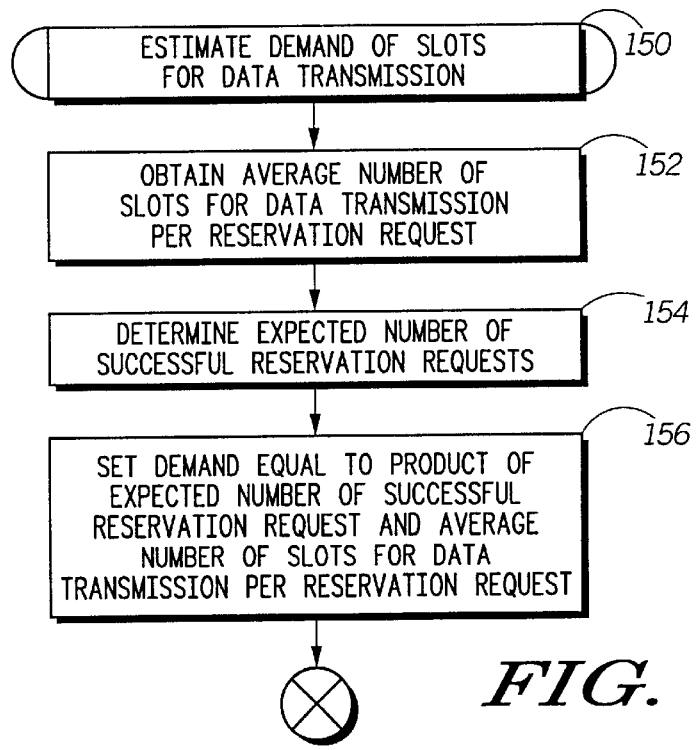
FIG. 18 is a flowchart describing a method for estimating the demand of slots for data transmission.

Referring to FIG. 18, what is shown is a flow chart describing a method for estimating demand of slots for data transmission. Here as illustrated at 150, the estimate for the demand of slots for data transmission is initiated. Thereafter as illustrated at 152, the system obtains the average number of slots for data transmission per reservation request. As illustrated at 154, this is followed by a determination of the expected number of successful reservation requests followed as illustrated at 156 by setting the demand equal to the product of the expected number of successful reservation requests and the average number of slots for data transmission per reservation request.

Figure 19:
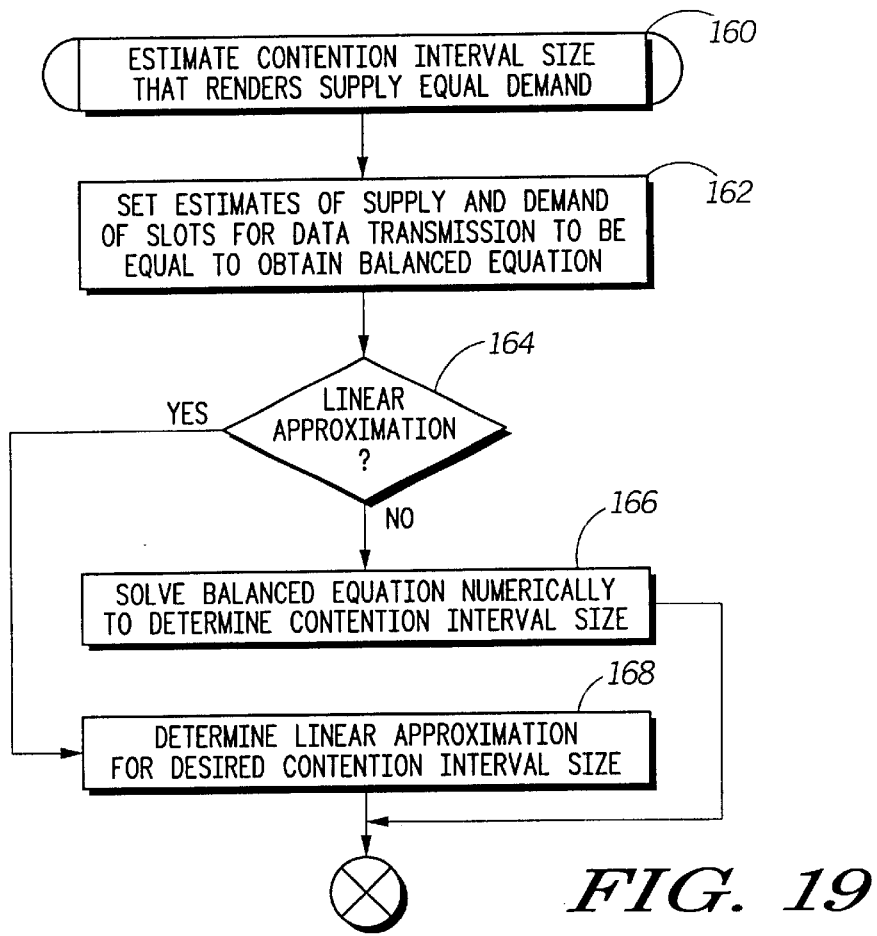
FIG. 19 is a flowchart describing a method for estimating Contention interval size that renders supply equal to demand.

As illustrated in FIG. 19, a flow chart is presented describing a method for estimating the contention interval size that renders supply equal to demand. Here as illustrated at 160, the process is started. Thereafter as illustrated at 162, the system sets the estimates of demand and supply of slots for data transmission to be equal to obtain the balanced equation.

As illustrated at 164, it is ascertained whether there is a requirement for a linear approximation. If not, as illustrated at 166, the balance equation is solved numerically to determine contention interval size. If a linear approximation is necessary then as illustrated in 168, the system determines the linear approximation for the desired contention interval size.

Figure 20:
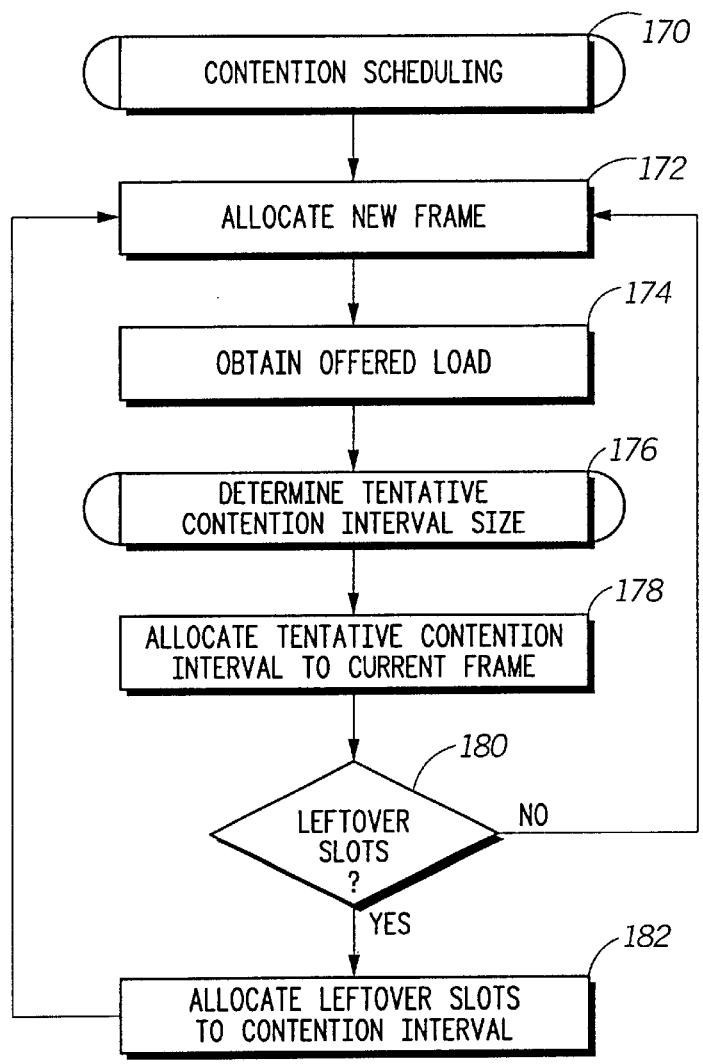
FIG. 20 is a flowchart describing contention scheduling, utilizing tentative allocations.

Referring now to FIG. 20, a flow chart is presented describing a contention schedule utilizing a tentative allocation. Here, as illustrated at 170 contention scheduling is initiated. Thereafter as illustrated at 172, the system allocates a new frame, followed at 174 by obtaining request offered load. As illustrated in 176, the system determines a tentative contention interval size from the allocation of the new frame and the request offered load. Thereafter as illustrated at 178, the system allocates a tentative contention interval to the current frame and determines at 180 whether there are any leftover slots. If so, as illustrated at 182, the leftover slots are allocated to the contention interval at which point the process is returned to the step of allocating a new frame. If there are no leftover slots, then the system returns directly to the step of allocating a new frame.

Figure 21:
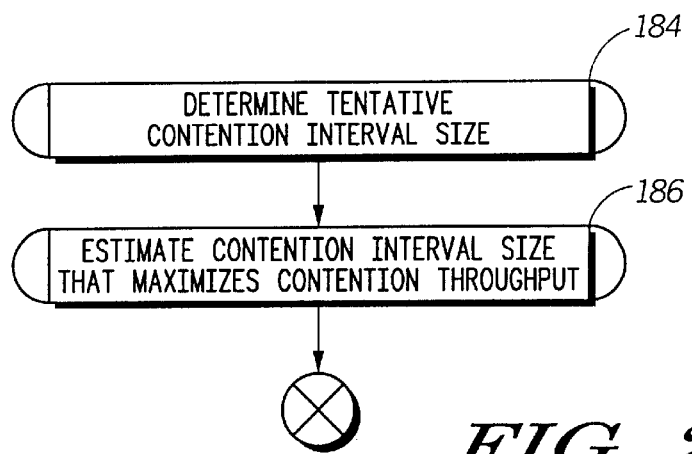
FIG. 21 is a flowchart describing a first method for determining contention interval size.

Referring now to FIG. 21, what is shown is a flow chart describing the first method of determining a tentative contention interval size. Here this is initiated at 184 with the determination provided at 186 to estimate contention interval size that maximizes the contention throughput.

Figure 22:
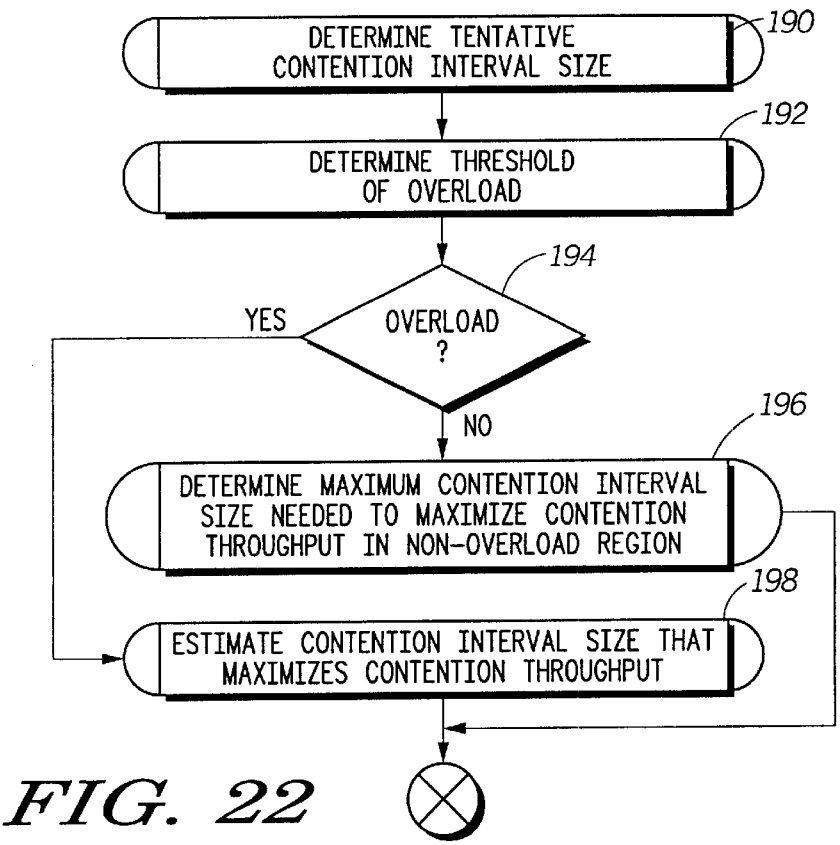
FIG. 22 is a flowchart describing a second method for determining tentative contention interval size.

Referring to FIG. 22, what is described is a flow chart describing a second method for determining a contention interval size in which as shown at 190, the process is initiated followed by a determination at 192 of the threshold of an overload. As illustrated at 194, the threshold is used to determine if there is an overloaded condition, and if there is no overloaded condition, then as illustrated at 196 the system determines the maximum contention interval size needed to maximize contention throughput in the non-overload region. If an overloaded condition is sensed, then as illustrated at 198, an estimation is made of the contention interval size that maximizes the contention throughput.

Figure 23:
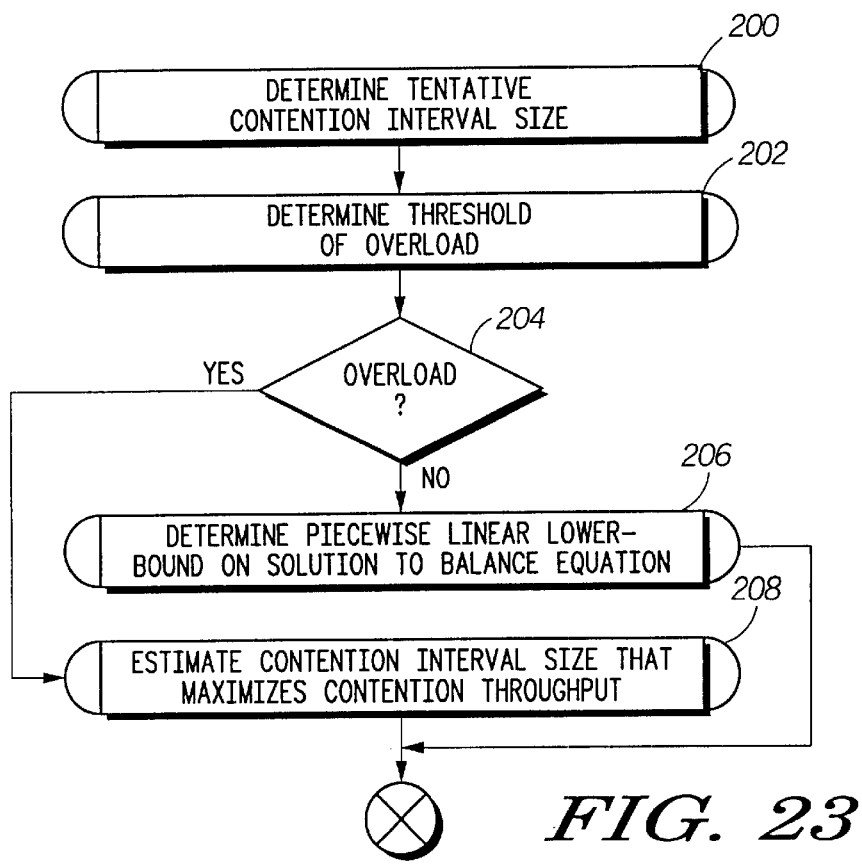
FIG. 23 is a flowchart describing a third method for determining tentative contention interval size.

Referring to FIG. 23, what is shown is flow chart describing a third method for determining contention interval size. Here, as illustrated at 200, the process is begun, followed by a determination of the threshold of an overload as illustrated at 202. If there is no overloaded condition as illustrated at 204, then as illustrated at 206, the system determines a piece-wise linear lower-bound solution to the balanced equation. If there is an overloaded condition then, as illustrated at 208, the system estimates contention interval size that maximizes contention throughput.

Figure 24:
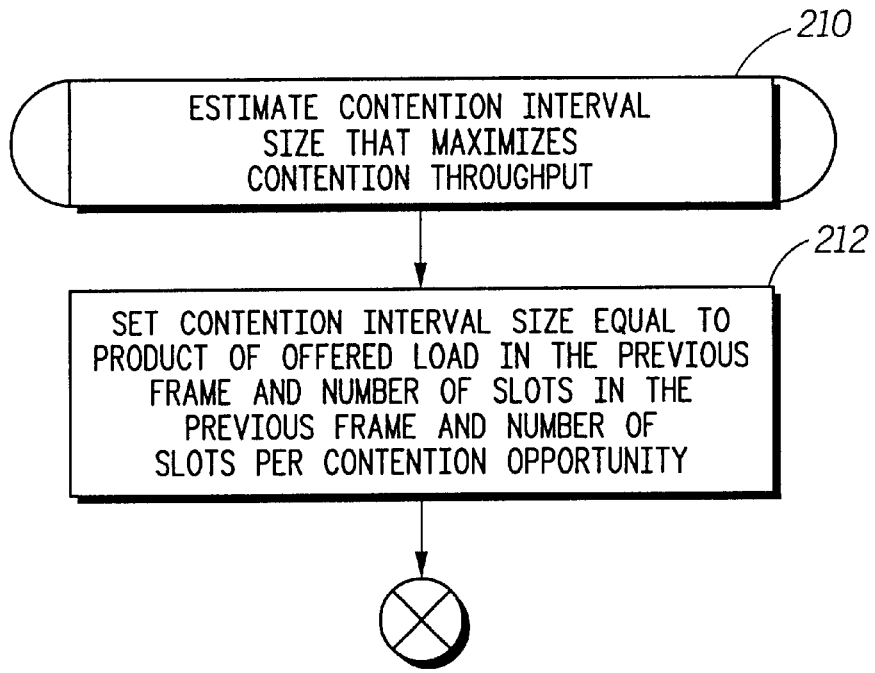
FIG. 24 is a flowchart describing a method for estimating contention interval size that maximizes contention throughput.

Referring now to FIG. 24, a flow chart is shown describing a method for estimating contention interval size that maximizes contention throughput. Here as illustrated at 210, the estimation process begins, followed by the setting the contention interval size equal to the product of request offered load in the previous frame, the number of slots in the previous frame and the number of slots per contention opportunity as illustrated at 212.

Figure 25:
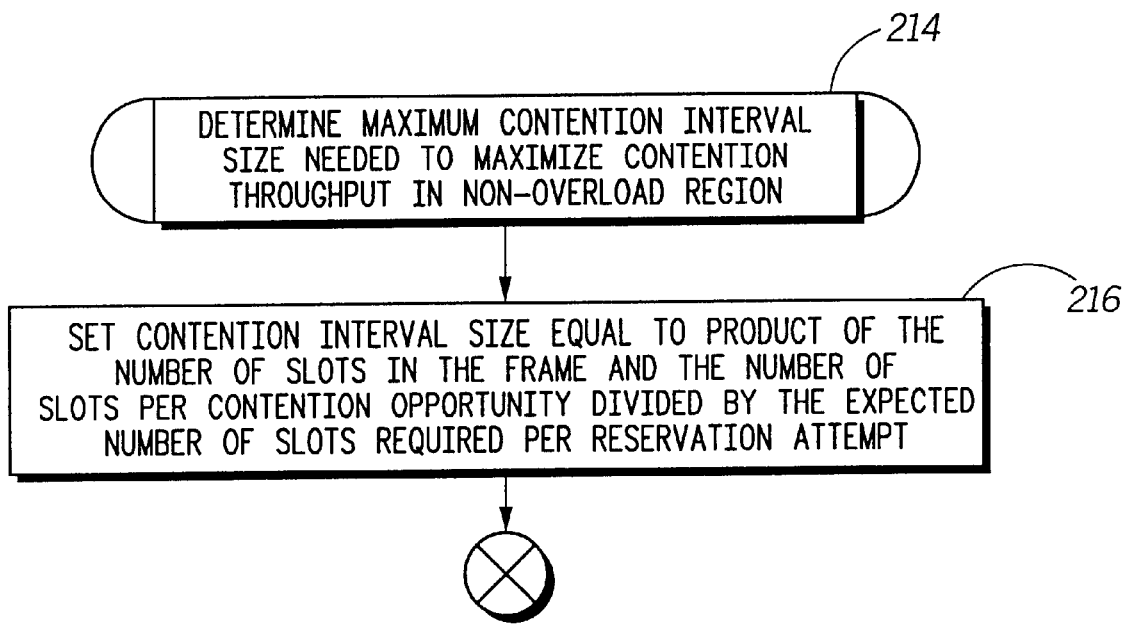
FIG. 25 is a flowchart describing a method for determining contention interval size needed to maximize contention throughput in a non-overload region; and, FIG. 26 is a flowchart describing a method for determining a piece-wise linear lower-bound on the solution to the balanced equation.

As illustrated in FIG. 25, a flow chart is shown describing a method for determining maximum contention interval size needed to maximize contention throughput in a non-overload region. Here, as illustrated at 214, the process is begun followed by a process illustrated at 216 in which the system sets the contention interval size equal to the product of the number of slots in the frame and the number of slots per contention opportunity divided by the expected number of slots required per reservation attempt.

Figure 26:
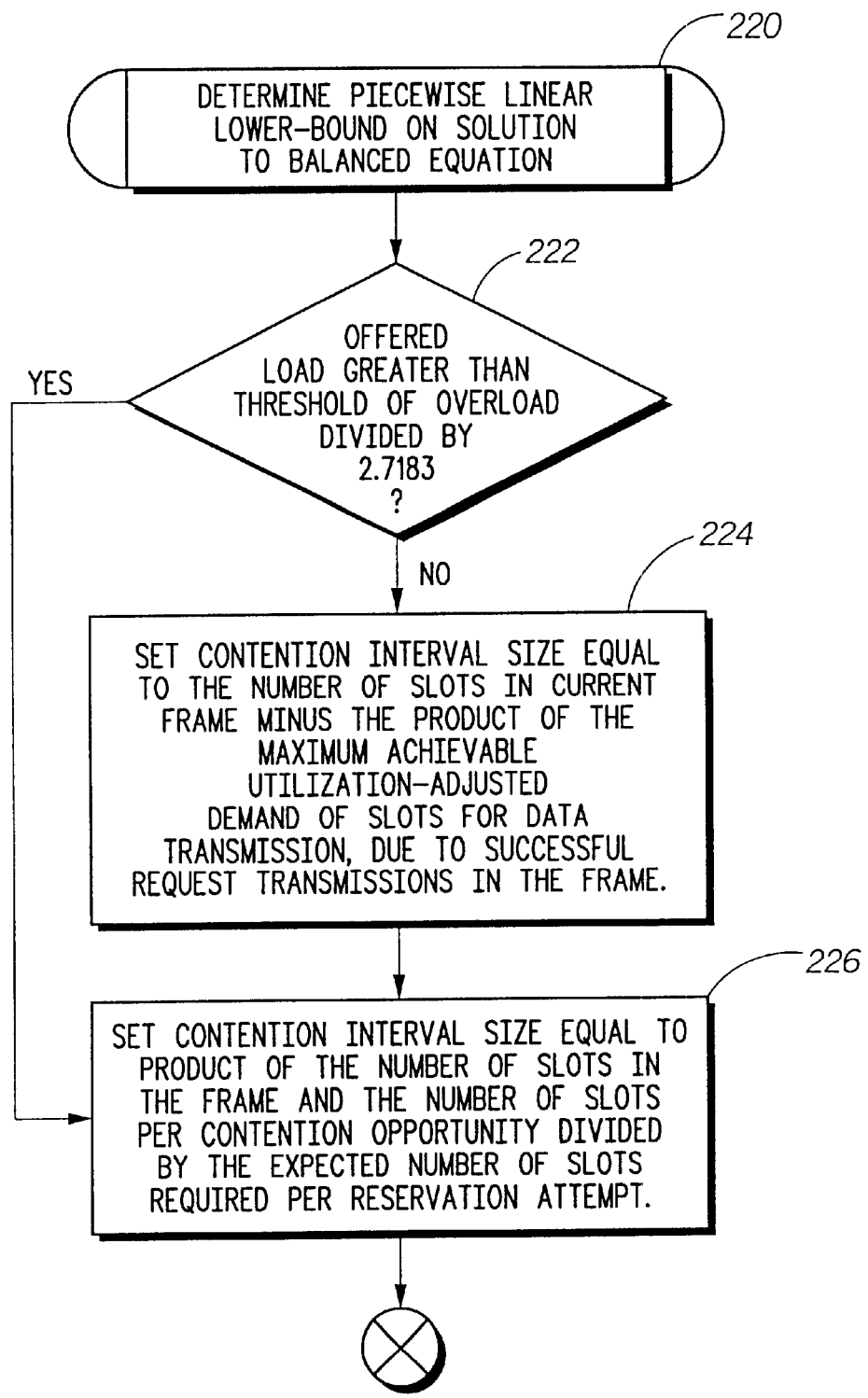

Referring now to FIG. 26, what is shown is a flow chart for determining a piece-wise linear lower-bound on solution to the balanced equation. Here the process is begun as illustrated at 220 followed by a decision at 222 as to whether or not the request offered load is greater than the threshold of an overload divided by 2.7183. If not, as illustrated at 224, the contention interval size is set equal to the number of slots in the current frame minus the maximum achievable utilization-adjusted demand of slots for data transmission due the successful request transmissions in the frame. Thereafter as illustrated in 226, the system sets the contention interval size equal to the product of the number of slots in the frame and the number of slots per contention opportunity divided by the expected number of slots required per reservation attempt.

If the request offered load is greater than the threshold of overload divided by 2.7183, then the process jumps to the process illustrated at 226.

It is to be noted that piggybacking load may be implicitly accounted for in the subject system by reducing the value of $\rho$ appropriately. While the request offered load for contention can be decreased by piggybacking, the result is that the effective demand for data transmission slots per contention request is increased accordingly. For example, a particular method for estimating the average number of slots reserved for data packets per request, while taking into consideration the effect of piggybacking, has been outlined by Sala, et al.

It is to be noted that fragmentation overhead may be implicitly accounted for by reducing the value of $\rho$ appropriately. When a data packet is fragmented into smaller packets, each of these smaller packets is concatenated with a fragmentation header to identify, among other things, the original packet as well as the position of the smaller packet within the original packet.

If the size of each frame is either fixed or known when it is time to determine the allocation for the frame, then it is straightforward to apply the present invention to allocate contention opportunities in the frame. If the size of each frame is not known a priori, but may vary from a predetermined minimum value, $T_{min}$, to a predetermined maximum value, $T_{max}$, wherein $T_{max}-T_{min}$ is at least the size of the largest packet, then the invention may be modified to accommodate such a variation. In this case, T[k], the size of the current frame, is initially assumed to be $T_{min}$, and a tentative number of slots are first allocated in the contention interval of frame k, such that this tentative allocation is at least as conservative as the allocation in the case of predetermined frame sizes. Should there be any leftover slots in a frame after allocating the remaining slots for data transmission, the leftover slots are included in the contention interval of the frame.

Figure 12:
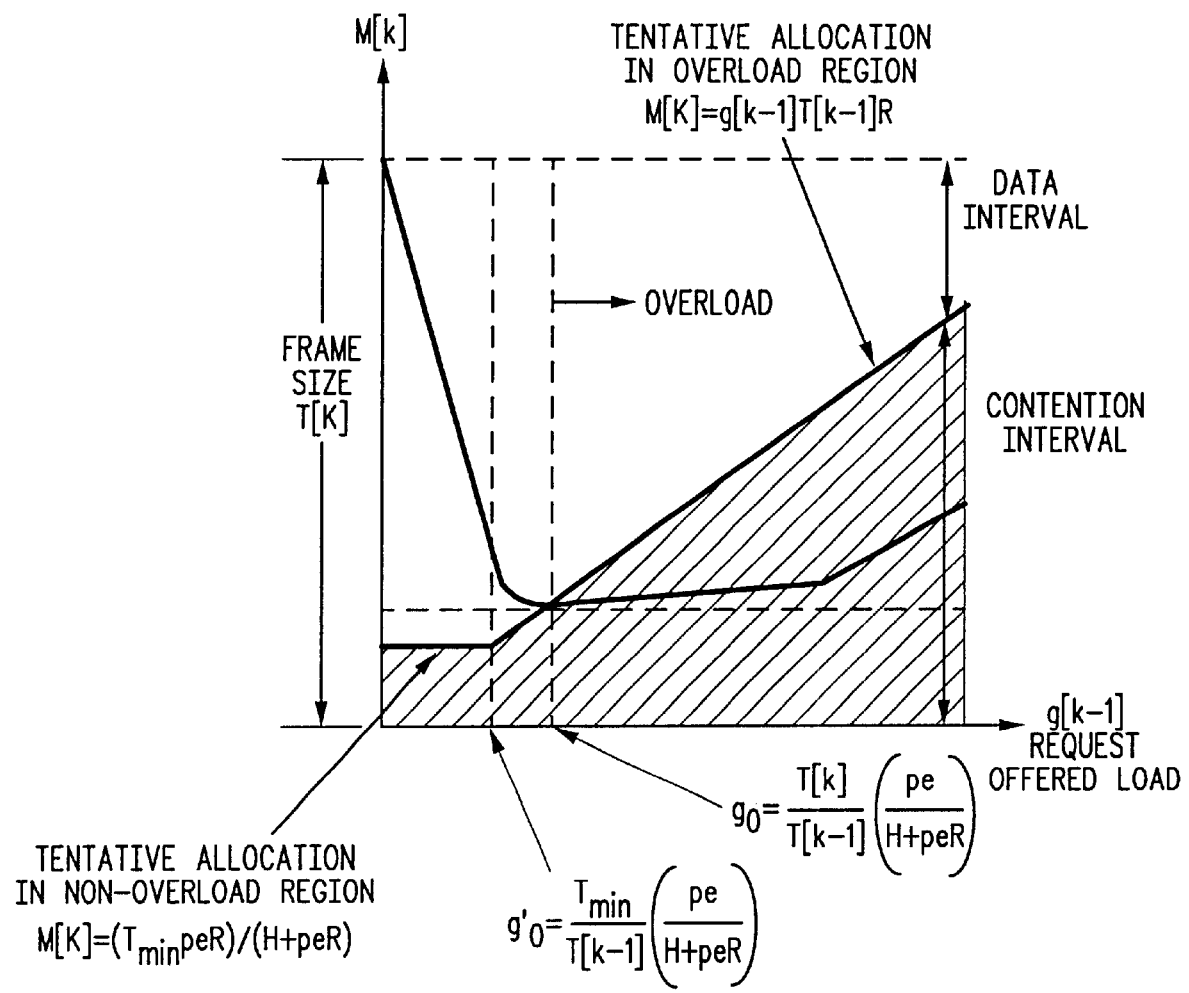
FIG. 12 is a diagrammatic representation showing the second embodiment subject to bounded frame size.

If it is known that $T_{min} \leq T[k] \leq T_{max}$, the second embodiment may be modified as shown in FIG. 12. Specifically, the number of slots to be initially allocated in the contention interval of frame k is given by $$M[k]=\max \{g[k-1]T[k-1]R,\ b(H, R, \rho)T_{min} R\}$$

Equivalently, $M[k]=b(H, R, \rho)T_{min} R$ for request offered load in the range $0 \leq g[k-1] \leq g'_0 = b(H, R, \rho)T_{min}/T[k-1]$, and $M[k]=g[k-1]T[k-1]R$ for higher request offered load.

As illustrated in FIG. 12, the above variation of the second embodiment retains much of the characteristics of the second embodiment. Specifically, the method of allocation is based on a piece-wise linear function of request offered load, with two linear segments, such that it has a constant non-zero value for request offered load ranging from zero to nearly the overload threshold and increases proportionally with request offered load otherwise.

Figure 13:
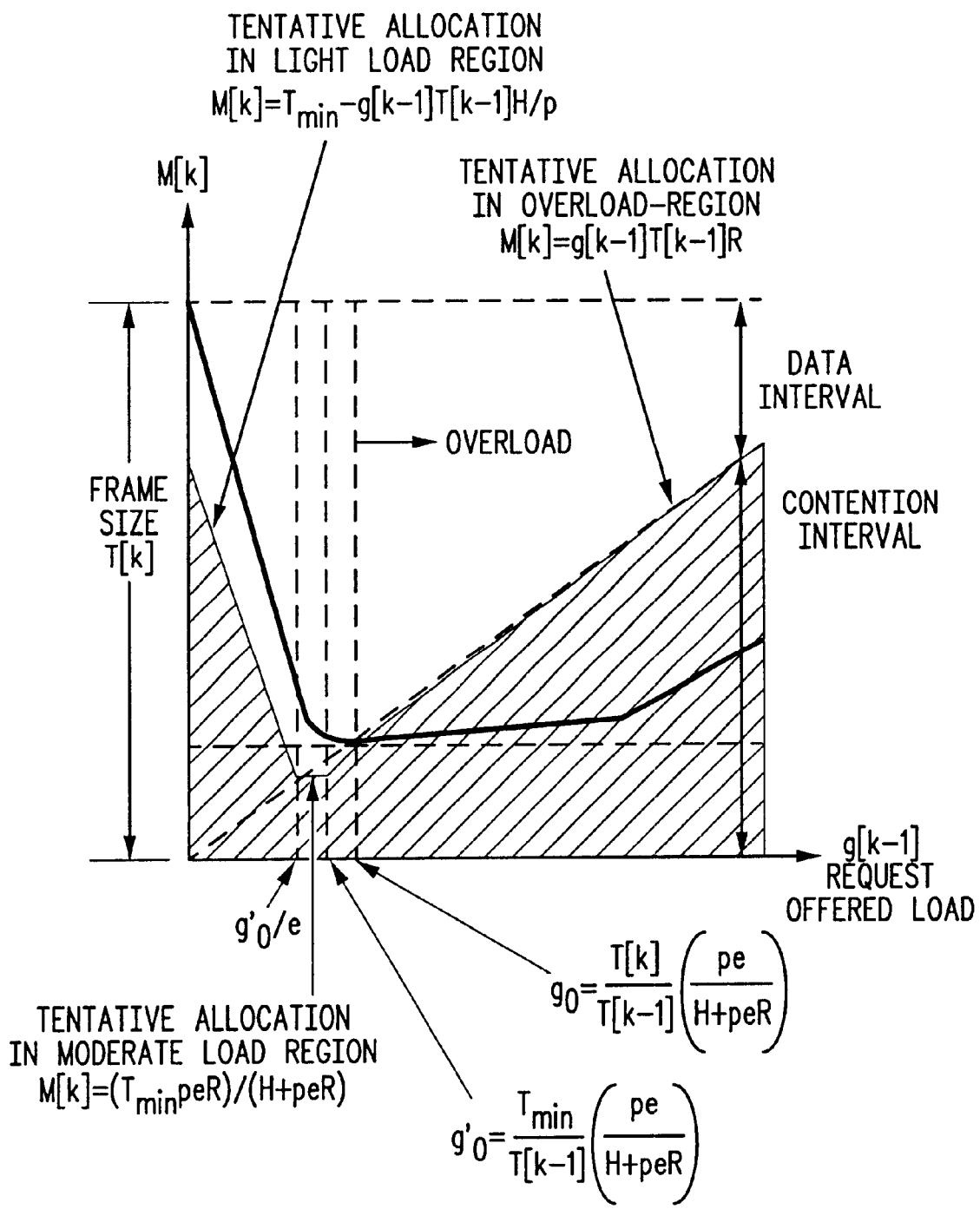
FIG. 13 is a diagrammatic representation showing the third embodiment subject to bounded frame size.

If it is known that $T_{min} \leq T[k] \leq T_{max}$, the third embodiment may be modified as shown in FIG. 13. Specifically, the number of slots to be initially allocated in the contention interval of frame k is given by $$M[k]=\max \{g[k-1]T[k-1]R,\ b(H, R, \rho)T_{min} R,\ (T_{min}-g[k-1]T[k-1]H/\rho)\}$$

Equivalently, $M[k]=T_{min}-g[k-1]T[k-1]H/\rho$ for request offered load in the range $0 \leq g[k-1] \leq g'_0/e$, $M[k]=b(H, R, \rho)T_{min} R$ for request offered load in the range $g'_0/e \leq g[k-1] \leq g'_0$, and $M[k]=g[k-1]T[k-1]R$ for higher request offered load, where $g'_0=b(H, R, \rho)T_{min}/T[k-1]$.

As illustrated in FIG. 13, the above variation of the third embodiment retains much of the characteristics of the third embodiment. Specifically, the method of allocation is based on a piece-wise linear function of the request offered load, with three linear segments, such that its value decreases linearly in when the request offered load is light, has a constant non-zero value in the request offered load is moderate, and increases proportionally with request offered load when the system is overloaded.

In both the variation of the second embodiment and the variation of the third embodiment, should there be any leftover slots in the frame after allocating the remaining slots for data transmission, the leftover slots are included in the contention interval of the frame.

It is possible that, after an initial allocation of slots in the data interval, there are not enough slots in the remainder of the frame to accommodate an additional packet or packet fragment, which is pending transmission. In this case, the frame is expanded by as many slots as needed to accommodate the packet or packet fragment. Provided that $(T_{max}-T_{min})$ is at least the size of the largest packet, the resulting frame size is bounded from above by $T_{max}$.

Having now described a few embodiments of the invention, and some modifications and variations thereto, it should be apparent to those skilled in the art that the foregoing is merely illustrative and not limiting, having been presented by the way of example only. Numerous modifications and other embodiments are within the scope of one of ordinary skill in the art and are contemplated as falling within the scope of the invention as limited only by the appended claims and equivalents thereto.

What is claimed is:

1. A method for selecting a contention interval size, in a shared medium communication network wherein a shared slotted channel is divided into successive frames, each including a contention interval for transmission of contention-based reservation requests and a data interval for transmission of contention-free data packets, comprising the steps of:

either specifying a request offered load in the network based on a priori knowledge or estimating a request offered load in the network based on a history of contention outcomes; and, selecting the contention interval size to be a convex function of the request offered load, wherein the convex function is one that has a single minimum value, is non-increasing for request offered load up to the point at which the function achieves the minimum value, and is non-decreasing for larger request offered loads.

2. The method of claim 1, wherein each contention interval consists of a plurality of contention opportunities, where in each contention opportunity is composed of a predetermined number of slots, and wherein the contention outcomes are determined by the number of requests transmitted in each contention opportunity being either no request transmitted, said contention outcome referred to as idle; or a single request transmitted, said contention outcome referred to as success; or when multiple requests are transmitted, said contention outcome is referred to as collision.

3. The method of claim 2, wherein the contention interval size, which is a convex function of the request offered load, is derived from a method of balancing frame-by-frame estimates of:

supply of slots for transmission of contention-free data packets; and, demand of slots for transmission of contention-free data packets.

4. The method of claim 3, wherein the estimate of the supply of data slots for transmission of contention-free data packets in a current frame is the number of slots in the frame minus the number of slots allocated to the contention interval of the frame.

5. The method of claim 4, wherein the estimate of the demand of slots for transmission of contention-free data packets in a current frame is derived from a method comprising the steps of: either specifying an average number of data slots reserved by each accepted reservation request based on a prior knowledge or estimating an average number of data slots reserved by each accepted reservation request based on a history of reservation requests;

determining an expected number of reservation requests that would be successfully transmitted in the contention interval of the current frame; and, multiplying the expected number of reservation requests and the average number of data slots reserved by each accepted reservation request.

6. The method of claim 5, wherein the expected number of reservation requests that would be successfully transmitted in the contention interval of the current frame is adjusted up by a factor that accounts for the desired utilization of the available shared bandwidth.

7. The method of claim 1, wherein the value of the request offered load at which the convex function achieves its minimum value is equal to the number of slots in the current frame divided by the product of the number of slots in the previous frame and the expected number of slots required per reservation attempt, and wherein the expected number of slots required per reservation attempt is a sum of an expected number of slots required for data transmission per reservation attempt and the number of slots per contention opportunity.

8. The method of claim 7, wherein the value of the offered load at which the convex function achieves its minimum value divides the range of values of all feasible request offered loads into two operation regions, each region with a different policy for allocating bandwidth in the contention interval.

9. The method of claim 8, wherein one region is a non-overload region and consists of request offered load values smaller than the value of the request offered load at which the convex function achieves its minimum value and wherein the other region is an overload region and consists of request offered load values at least as large as the value of the request offered load at which the convex function achieves its minimum value.

10. The method of claim 9, wherein the policy for allocating bandwidth in the contention interval when the offered load falls in the non-overload region comprises one of the steps of: either allocating, in the contention interval, a tentative number of slots based on a lower-bound on the number of slots needed to balance the supply and demand of slots for transmission of contention-free data packets: or allocating, in the data interval, as many reserved slots as permissible for data transmission; and, filling up the remainder of the frame with contention opportunities, provided there are any leftover slots.

11. The method of claim 10, wherein the lower-bound on number of slots needed to balance the supply and demand of slots for transmission of contention-free data packets is the number of slots needed to maximize contention throughput in the contention interval, given the request offered load.

12. The method of claim 10, wherein the lower-bound on number of slots needed to balance the supply and demand of slots for transmission of contention-free data packets is the maximum number of slots needed to maximize contention throughput in the contention interval, given any request offered load within the non-overload region.

13. The method of claim 10, wherein the lower-bound on r.umber of slots needed to balance the supply and demand of slots for transmission of contention-free data packets is the maximum of the maximum number of slots needed to maximize contention throughput in the contention interval given any offered load within the non-overload region and a linear function of the offered load, wherein, when the offered load has a value zero, the function has a value equal to the frame size: and, when the offered load has a value equal to that of the offered load at the threshold of overload divided by e, the function has a value equal to the maximum number of slots needed to maximize contention throughput in the contention interval, given any request offered load within the non-overload region.

14. A method for selecting a contention interval size, in a shared medium communication network wherein as shared slotted channel is divided into successive frames, each including a contention interval for transmission of contention-based reservation requests and a data interval for transmission of contention-free data packets, comprising the steps of:

ascertaining the request offered load in the previous frame; and utilizing the request offered load determined by ascertaining the request offered load in the previous frame to specify the contention interval, wherein the step of specifying the contention interval includes the steps of providing a non-overload region and a overload region of the request offered load making a minimum allocation required to balance supply and demand of slots for data transmission for the non-overload region and making an allocation that maximizes contention throughput for the overload region.

15. A method for selecting a contention interval size, in a shared medium communication network wherein as shared slotted channel is divided into successive frames, each including a contention interval for transmission of contention-based reservation requests and a data interval for transmission of contention-free data packets, comprising the steps of:

ascertaining the request offered load in the previous frame; and utilizing the request offered load determined by ascertaining the request offered load in the previous frame to specify the contention interval, wherein the step of specifying the contention interval includes the steps of providing a light load region, a moderate load region and a overload region of the request offered load, making an allocation that is linearly decreasing function of the request offered load for the light load region making a minimum allocation required to balance supply and demand of slots for data transmission for the moderate load region, and making an allocation that maximizes contention throughput for the overload region.

* * * * *